US011013019B2

(12) United States Patent
Malik et al.

(10) Patent No.: US 11,013,019 B2
(45) Date of Patent: May 18, 2021

(54) WIRELESS TRANSCEIVER CALIBRATION OPPORTUNITIES

(71) Applicant: QUALCOMM Incorporated, San Diego, CA (US)

(72) Inventors: Rahul Malik, San Diego, CA (US); Jong Hyeon Park, San Jose, CA (US); Udara Fernando, San Diego, CA (US); Alexei Yurievitch Gorokhov, San Diego, CA (US); Nan Zhang, San Diego, CA (US); Junsheng Han, Sunnyvale, CA (US); Scott Hoover, Del Mar, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/454,828

(22) Filed: Jun. 27, 2019

(65) Prior Publication Data

US 2020/0029345 A1 Jan. 23, 2020

Related U.S. Application Data

(60) Provisional application No. 62/699,446, filed on Jul. 17, 2018.

(51) Int. Cl.
*H04W 72/12* (2009.01)
*H04W 76/27* (2018.01)
(Continued)

(52) U.S. Cl.
CPC ....... *H04W 72/1257* (2013.01); *H04L 27/364* (2013.01); *H04W 24/10* (2013.01);
(Continued)

(58) Field of Classification Search
CPC ....... H04B 17/14; H04B 17/21; H04L 27/364; H04W 24/08; H04W 24/10;
(Continued)

(56) References Cited

U.S. PATENT DOCUMENTS 8,891,598 B1 11/2014 Wang et al.
2015/0131543 A1 5/2015 Huo et al.
(Continued)

OTHER PUBLICATIONS

Intel Corporation: "Further Consideration on PA Calibratioin Gap", 3GPP TSG-RAN WG4 Meeting #86bis, 3GPP Draft; R4-1804161_ Further Consideration on PA Calibration Gap, 3rd Generation Partnership Project (3GPP), Mobile Competence Centre; 650, Route Des Lucioles; F-06921 Sophia-Antipolis Cedex; France, vol. RAN WG4, No. Melbourne, Australia; Apr. 16, 2018-Apr. 20, 2018, Apr. 15, 2018 (Apr. 15, 2018), pp. 1-4, XP051431062, Retrieved from the Internet: URL: http://www.3gpp.org/ftp/Meetings%5F3GPP% 5FSYNC/RAN4/Docs/ [retrieved on Apr. 15, 2018] section 2.2.
(Continued)

*Primary Examiner* — Kan Yuen

(57) ABSTRACT

Methods, systems, and devices for wireless communications are described. In some systems, a user equipment (UE) may perform calibration of a transceiver chain to maintain or improve operation of a device or comply with legal or protocol requirements. The UE may receive one or more wireless signals indicating a first set of resources where the first device is scheduled to transmit or receive communications. The UE may calibrate a wireless transceiver chain of the first device in a second set of resources. The second set of resources excludes the first set of resources and includes at least a portion of a third set of resources. The third set of resources are resource in which the first device has an option to transmit or receive communications based on a protocol configuration.

26 Claims, 13 Drawing Sheets

(51) Int. Cl.
  *H04W 74/08* (2009.01)
  *H04W 56/00* (2009.01)
  *H04W 72/04* (2009.01)
  *H04L 27/36* (2006.01)
  *H04W 76/28* (2018.01)
  *H04W 68/00* (2009.01)
  *H04W 24/10* (2009.01)

(52) U.S. Cl.
  CPC ....... *H04W 56/001* (2013.01); *H04W 68/005* (2013.01); *H04W 72/046* (2013.01); *H04W 74/0833* (2013.01); *H04W 76/27* (2018.02); *H04W 76/28* (2018.02)

(58) Field of Classification Search
  CPC ......... H04W 52/0216; H04W 52/0219; H04W 52/0229; H04W 56/001; H04W 68/005; H04W 72/046; H04W 72/1257; H04W 74/0833; H04W 76/27; H04W 76/28; H04W 88/02; Y02D 30/70
  See application file for complete search history.

(56) References Cited

U.S. PATENT DOCUMENTS

2016/0094318 A1* 3/2016 Shattil .................. H04J 13/004
  375/267
2018/0183390 A1* 6/2018 Benjamin ................ H03F 1/32

OTHER PUBLICATIONS

International Search Report and Written Opinion—PCT/US2019/041809—ISA/EPO—dated Nov. 18, 2019.
QUALCOMM Incorporated: "Calibration Gap Configuration", 3GPP TSG-RAN WG4 Meeting #87, 3GPP Draft; R4-1807881 PA Cal Gaps, 3rd Generation Partnership Project (3GPP), Mobile Competence Centre; 650, Route Des Lucioles; F-06921 Sophia-Antipolis Cedex; France, vol. RAN WG4, No. Busan, KR; May 21, 2018-May 25, 2018, May 20, 2018 (May 20, 2018), 3 pages, XP051447414, Retrieved from the Internet URL: http://www.3gpp.org/ftp/Meetings%5F3GPP%5FSYNC/RAN4/Docs/ [retrieved on May 20, 2018] p. 1, line 11-line 24, p. 2, line 1-line 12.

* cited by examiner

WIRELESS TRANSCEIVER CALIBRATION
OPPORTUNITIES

CROSS REFERENCE TO RELATED
APPLICATION(S)

This application claims the benefit of U.S. Provisional Application Ser. No. 62/699,446, entitled "WIRELESS TRANSCEIVER CALIBRATION OPPORTUNITIES" and filed on Jul. 17, 2018, which is expressly incorporated by reference herein in its entirety.

BACKGROUND

The following relates generally to wireless communications, and more specifically to determining calibration opportunities for a transceiver chain of a device.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may calibrate a transceiver chain to adjust its power amplification, to remove or reduce impairments, or to meet requirements for radiation exposure. If calibration is not performed, device performance may be reduced or radiation exposure requirements may not be met.

DETAILED DESCRIPTION

Figure 1:
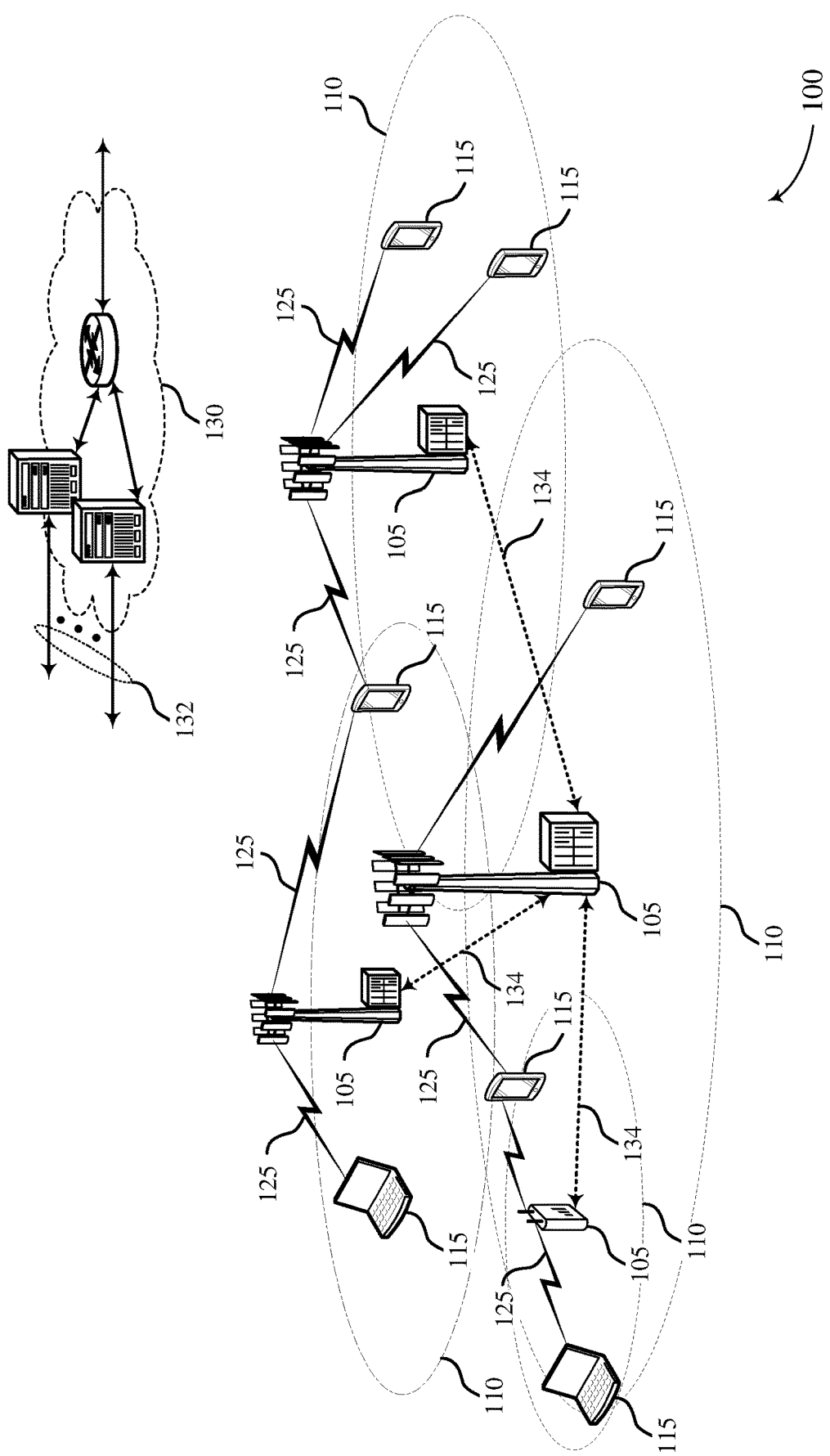
FIG. 1 illustrates an example of a system for wireless communications that supports determining calibration opportunities in accordance with aspects of the present disclosure.

Future wireless network deployments may present increased calibration requirements on wireless devices. For example, new high frequency millimeter wave bands for 5G-NR may have additional regulatory restrictions pertaining to radiation exposure to humans, which may be known as Maximum Permissible Exposure (MPE). Additionally NR is expected to adopt several advanced transceiver algorithms/architectures. Some of these are expected to require calibrations to eliminate or reduce common impairments imposed by various elements in the transceiver chain. It may be desirable in some cases to perform various measurement operations, such as measuring a distance to nearby objects or human tissues or performing device internal calibrations, in-band by leveraging existing componentry on the device. Using existing antennas and transceiver chains for making such measurements may lead to advantages such as reduced device cost, power consumption, and better device form-factor. However, using existing componentry may lead to conflicts in terms of usage of said componentry for (a) mission-mode operations such as wireless communication and (b) for measurements or calibration procedures. In general it may be advantageous to perform these measurements or calibrations in a manner that does not impede or impair regular transmit/receive operations required by a wireless protocol, such as the 5G-NR specifications.

In recognition of the foregoing, Applicants have developed systems, methods, and devices for identifying opportunities for calibration and calibrating during those opportunities. For example, some embodiments may identify specific opportunities for performing calibration and measurements and the conditions when they may be used in a protocol timeline. A device may perform a calibration or measurement based on network configuration, scheduled communications, device condition (such as the presence or severity of impairments of a transceiver chain), or the like. According to an example embodiment, a method for calibration of a first device includes receiving one or more wireless signals indicating a first set of resources where the first device is scheduled to transmit or receive communications. The method may include calibrating a wireless transceiver chain of the first device in a second set of resources, wherein the second set of resources exclude the first set of resources and include at least a portion of a third set of resources. The third set of resources include resource in which the first device has an option to transmit or receive communications based on a protocol configuration.

According to another example embodiment, a method for calibration includes identifying a first time window corresponding to an opportunity to receive signals from or transmit signals to a second device. The method includes transitioning by the first device from a lower power state to a high power state during a second time window, the second time window including the first time window. The method further includes calibrating a transceiver chain of the first device during a portion of the second time window, the portion of the second time window outside the first time window.

According to yet another embodiment, a method for calibration of a first device includes identifying, by a first device, a power amplifier calibration gap in a protocol timeline. The method further includes calibrating a wireless transceiver chain of the first device during the power amplifier calibration gap. The calibrating may include one or more of: a transmit power or a beam to avoid an MPE level; a mismatch between an in-phase (I) section of the transceiver chain and a quadrature (Q) section of the transceiver chain; or a power density.

Aspects of the disclosure are initially described in the context of wireless communications systems. Additional aspects of the disclosure are described with respect to a UE calibration process and a process flow. Aspects of the disclosure are further illustrated by and described with reference to apparatus diagrams, system diagrams, and flowcharts that relate to online calibration of a device.

FIG. 1 illustrates an example of a wireless communications system 100 that supports online device calibration in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, 50, 80, 100, 200, 400 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 50, 60, 80 100, 200, 400 MHz, etc.) at reduced symbol durations (e.g., 8.9 micro-seconds or 16.67 microseconds). By way of example, a numerology used for a mmW deployment may include a CC bandwidth of 50, 100, 200, or 400 MHz, a subcarrier spacing of 60 kHz or 120 kHz for data and a subcarrier spacing of 240 kHz for SSB transmission, with a symbol duration of 8.9 microseconds (e.g. for 120 kHz sub-carrier spacing). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

New high frequency mmW bands may have additional regulatory restrictions pertaining to radiation exposure to humans that may limit the power density exposure to humans in proximity of a mmW device (such as a 5G-NR base station, a customer-premises equipment (CPE) or UE). In general, power-density is a function of transmitted power and distance to the point of measurement but may also depend on factors such as beam width. In some cases, a device may adopt several advanced transceiver algorithms/architectures to eliminate or reduce common impairments imposed by various elements in the transceiver chain and/or stay below exposure limits. In some cases it may be helpful or necessary to perform calibrations online to deal with effects imposed by device temperature, active configuration of the device, device aging, or the like. Various measurement operations such as measuring distance to nearby object (such as human tissue), performing device internal calibrations, or the like may be performed in-band by leveraging existing componentry on the device. Using existing componentry that used for communications for calibration can lead to advantages such as reduced device cost, power consumption, better form-factor, or the like.

In one embodiment, the wireless communications system 100 may support online calibration. Online calibration may include calibrating while a UE 115 is in an RRC active, RRC inactive, or RRC idle state. The UE 115 may be a scheduled entity in that it is permitted or required to transmit or receive signals as indicated or configured by a network entity, such as a base station 105. The base station 105 or other network entity may be a scheduling entity that determines the resources for usage by one or more UEs 115 and schedules those UEs 115 via configurations or grants. An online UE 115 may be available for or involved in network communications. For example, when a UE 115 is in an RRC active state, the UE 115 may be available to receive PDCCH scheduling UL or DL grants. Furthermore, the UE 115 may have received system information or other information indicating the specific network protocol configuration of the UE 115, such as an RRC configuration, random access channel (RACH) configuration, synchronization signal block (SSB) configuration, or the like. The UE 115 may be available for paging according to a paging interval during an RRC inactive or RRC idle. In some cases, a UE 115 may be configured and instructed to enter a discontinuous reception (DRX) mode where the UE 115 may enter a low power state for a period of time and then enter a higher power state during a time window to listen for or transmit signals until the window is over and the UE 115 again enters the low power state. The low power state may include a power mode or power state (such as a sleep mode) where the UE 115 turns off a portion of one or more circuits or reduces the processing it performs. For example, the UE 115 in the low power mode may not monitor for PDCCH (or other signals) or transmit signals during the low power mode.

In one embodiment, a UE 115 may identify calibration opportunities, such as online calibration opportunities based on the UEs knowledge of a protocol, a current configuration of the wireless communications system 100, scheduled UL or DL grants, or the like. The UE 115 may include a scheduler that can identify appropriate opportunities and schedule various measurements/calibrations on the UE 115 based on the protocol timeline as dictated by a base station 105 in accordance with a communication standard (such as 3GPP specifications). The UE 115 may be configured to operate according to a protocol or may be configured with details of a protocol that will be used for a specific interface or communication network. Additionally, the UE 115 may receive signals or communications that indicate the timing or resource used for various purposes. For example, the UE 115 may receive system information that indicates a timing for certain signals or opportunities (such as for SSB symbols or RACH opportunities), numerologies for frame structures, or the like. DL or UL grants may also be received. Based on this information, the UE 115 may generate a protocol timeline for system resources. Within that timeline, the UE 115 may identify resources or time periods where calibration may be performed. For example, the UE 115 may identify resources (symbols and/or subcarriers on an antenna port) where an SSB is scheduled. The UE 115 may identify one or more SSB symbols as a calibration opportunity if the UE 115 does not need to receive the SSB symbols, is not scheduled with a DL grant, and the number of contiguous SSB symbols is greater than a threshold. As another example, the UE 115 may identify resources (symbols and/or subcarriers) where a RACH is scheduled. The UE 115 may identify one or more RACH symbols as a calibration opportunity if the UE 115 does not need to transmit in the RACH symbols, is not scheduled with a UL grant, and the number of contiguous RACH symbols is greater than a threshold. The threshold may correspond to a length of time needed by the UE 115 to perform different types of calibration.

When a calibration opportunity has been identified, the UE 115 may perform calibration within the opportunity. As discussed previously, the UE 115 may calibrate a same transceiver chain that is used to transmit or receive signals outside the calibration opportunity. Calibration may be performed using internal loopback or external loopback. During internal loopback, calibrations may be performed without transmitting wireless signals on an antenna. For example, internal signals may be generated and measurements performed at various points in the transceiver chain without requiring the transmission of a signal over the air. Based on the internal signal and measurement, the UE 115 may correct an impairment or modify a transmit power. Although the calibration may be performed using internal loopback, the UE 115 may nevertheless be unavailable for transmission or reception of signals on the transceiver chain.

External loopback may indicate that transmission and reception of signals on some antennas may be necessary. For example, a subset of antenna elements may be used to transmit a signal and a different subset of antenna elements may receive the transmitted signal. During the calibration opportunity, the UE 115 may transmit a calibration signal using at least one antenna port. This calibration signal may be received by a receiving device, such as a base station 105, another UE 115, or the same UE 115 (e.g., at different antenna ports). The receiving device may identify a parameter of the calibration signal and the UE 115 may modify operation of the transceiver chain based on the parameter. For example, if the measured parameter is different than an expected parameter, the UE 115 may calibrate portions of the transceiver chain to remove the discrepancy. Measurements on the transmitted and received signal may help identify discrepancies between anticipated parameters and actual parameters of transmitted signals. In some embodiments, transmission for external loopback may be performed at very low-power levels to comply with network requirements and avoid interfering with network communications. Based on measurements during external or internal loopback, the UE 115 may calibrate the transceiver chain by adjusting one or more parameters, such as a transmit power, a beam, a mismatch between an in-phase (I) section of the transceiver chain and a quadrature (Q) section of the transceiver chain, a power amplifier non-linearity, or the like.

The UE 115 may perform calibration and measurements for various purposes or parts of a transceiver chain. For example, in order to limit exceeding an MPE, the UE 115 may detect external objects and/or classify them as human tissue (e.g., detect a reflector and classify as human tissue based on movement). MPE measurements may be used to avoid radiation exposure which may be based on the frequency used by a transmitter. For example, radiation exposure, and thus MPE requirements, for mmW frequencies may be different than for non-mmW frequencies. When human tissue is detected, the output power of a transmission may be calibrated to avoid exceeding the MPE requirements. Similarly, transceiver impairments such as I Q mismatch can be calibrated or resolved thereby improving transceiver performance.

Transceiver chain calibration may be used to calibrate different circuits or configurations at baseband, intermediate frequency (IF), and radio frequency (RF) levels. In one embodiment, the calibration may take place at a baseband analog output, a digital-to-analog converter (DAC) output, a radio frequency (RF) output, or even at various intermediate stages. Some possible intermediate stages may include at a mixer output, a filter output, a variable gain amplifier (VGA) output.

In one embodiment, the UE 115 may (re)use a power amplifier calibration gap to perform calibrations on the transceiver chain other than in the power amplifier. For example, the UE 115 may use derivatives of a power amplifier calibration gap, such as a rank restricted gap, or total gap for different calibrations not in the power amplifier. For example, the calibration may include DPD kernel selection, I Q mismatch, MPE requirements, or others.

In one embodiment, a calibration opportunity may span a system bandwidth. That is, the UE 115 may calibrate across a range of frequencies during the system bandwidth. In this case, a whole transceiver chain may be occupied with calibration or measurement. Although other transceiver chains may be available for communications, the calibrated transceiver chain may be unavailable for transmission or reception across a full system bandwidth during the calibration opportunity. In other embodiments, a calibration opportunity may be less than a full system bandwidth. For a partial calibration, the UE 115 may transmit or receive non-calibration signals using antennas, antenna ports, or transceiver chains not involved in the calibration process.

Figure 2A:
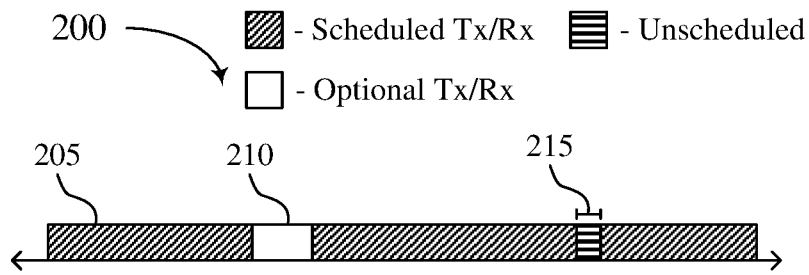
FIGS. 2A, 2B, 2C, and 2D illustrate schematic diagrams of example protocol timelines supporting identifying calibration opportunities in accordance with aspects of the present disclosure.
Figure 2B:
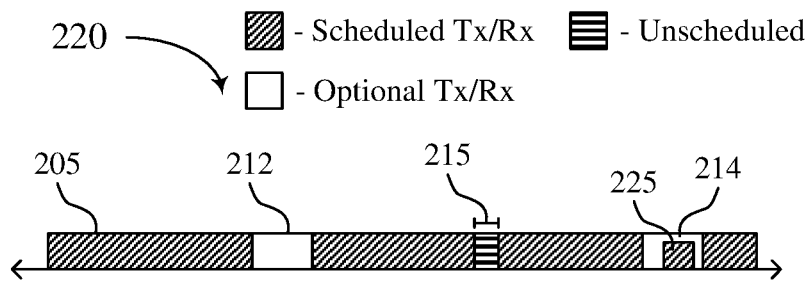

FIGS. 2A-2B schematically illustrate timings for calibration opportunities within a protocol timeline, according to example embodiments. Although the protocol timelines are illustrated along a single horizontal time dimension for simplicity, it will be understood that protocol timelines may extend in additional dimensions such as frequency. Thus, a UE 115 may identify calibration opportunities that extend across frequency and time or that extend only partially across frequency or time. Furthermore, although the timelines will be discussed in relation to communications with a network, similar principles may be applied to any communications where a UE 115 is acting as a scheduled entity. For example, the timelines may be analogous to timelines for direct communications between UEs. A UE 115 may construct the protocol timelines of FIGS. 2A, 2B, 2C, and/or 2D based on system information, UL or DL grants received from a scheduling entity, or preconfigured knowledge or details of a protocol used for an air interface with a network.

FIG. 2A is a schematic diagram of a protocol timeline 200 for a UE 115 illustrating scheduled Tx/Rx resources 205, optional Tx/Rx resources 210, and unscheduled resources 215, according to one example embodiment. The scheduled Tx/Rx resources 205 may include resources in which the UE 115 is scheduled for UL and/or DL transmissions. Individual allocations are not illustrated, but the scheduled Tx/Rx resources 205 may be filled with control channel, data channel, physical channel, or other channel transmissions or receptions scheduled with the UE 115 by a scheduling entity (such as a base station 105). The UE 115 may be unable to skip transmission or reception during the scheduled Tx/Rx resources 205 without the network experiencing degraded throughput or performance.

The optional Tx/Rx resources 210 may include resources where a UE 115 has an option to transmit or receive. For example, some resources of the optional Tx/Rx resources 210 may be scheduled or configured to provide opportunities for a UE 115 to obtain system information, system synchronization, or request resources for an UL transmission. Optional resources may include resources where at least one of a base station 105 or the UE 115 is scheduled to transmit or monitor for a transmission while the other of the base station 105 or the UE 115 has the option to receive or transmit. One example of an optional Tx/Rx resource 210, according to one embodiment, includes symbols corresponding to an SSB. In the case of an SSB, the base station 105 may be scheduled to transmit but the UE 115 may have the option of monitoring for that signal. An SSB may include synchronization signals and/or system information, such as a master information block (MIB) in a physical broadcast channel (PBCH). A SSB may include a plurality of symbols and/or a plurality of SSBs may be placed contiguously for different beams. If the UE 115 does not expect to receive or process one or more symbols of an SSB, the UE 115 may instead use those symbols for calibration. By way of example, a network configuration known to the UE 115 may include SSBs with 4 symbols in length with two SSBs placed contiguously in a protocol timeline, making 8 symbols. If the UE 115 does not have a need to synchronize with the network (is already sufficiently synchronized) and does not have a need to obtain system information (system information is sufficiently recent), the UE 115 may forgo monitoring those symbols and instead perform calibration. The UE 115 may also check to determine whether it is scheduled for a DL grant during one or more of the SSB symbols. If the length of contiguous SSB symbols that are free span a duration equal to or greater than a duration needed to perform calibration, the UE 115 may decide to perform calibration during those symbols. In some cases, the UE 115 may be able to receive a synchronization signal and/or system information during some symbols of one or more contiguous SSB symbols and then perform calibration during one or more remaining symbols.

Another example of optional Tx/Rx resources 210, according to one embodiment, includes symbols corresponding to a RACH. In the case of RACH, the UE 115 may have the option to transmit but the base station 105 may be scheduled to monitor for a transmission. For example, a RACH may include symbols and subcarriers allocated for a transmissions of a RACH preamble or buffer status report (BSR) to request UL resources from a scheduling entity. If the UE 115 does not expect to request UL resources or otherwise utilize the RACH symbols (e.g., the UE 115 has an empty buffer) and is not scheduled for a UL transmission, the UE 115 may use some resources of the RACH for calibration. If the length of contiguous SSB symbols that are free span a duration equal to or greater than a duration needed to perform calibration, the UE 115 may decide to perform calibration during those symbols. In some cases, the UE 115 may be able to transmit a RACH preamble or transmit in a UL grant in symbols of one or more contiguous RACH symbols and then perform calibration during one or more remaining symbols.

The protocol timeline 200 also shows unscheduled resources 215 where there are no scheduled Tx/Rx resources 205 or optional Tx/Rx resources 210. However, the length of the unscheduled resources 215 may be insufficient to allow the UE 115 to perform calibrations or measurements for a transceiver chain.

FIG. 2B is a schematic diagram of a protocol timeline 220 for a UE 115 illustrating scheduled Tx/Rx resources 205, SSB resources 212, RACH resources 214, unscheduled resources 215, and resources for scheduled UL grant 225, according to one example embodiment. The SSB resources 212 and RACH resources 214 may represent optional Tx/Rx resources 210 where the UE 115 may have an option to transmit or receive signals. As noted above with respect to FIG. 2A, in certain situations, the unscheduled resources 215 may be too short to allow for calibration. Or, for example, the RACH resources 214 may be unavailable due to a scheduled UL grant (resources for scheduled UL grant 225). In one embodiment, if the SSB resources 212 are not too short, the UE 115 uses the SSB resources 212 for calibration of a transceiver chain as it may represent the only location in the protocol timeline 220 where calibration may be performed without impacting throughput with for the UE 115 or network.

It should be understood that resources of a calibration opportunity may extend from an optional Tx/Rx (e.g., SSB resources 212) into an unscheduled resource 215, in some situations. For example, if the unscheduled resources 215 were immediately neighboring the SSB resources 212, calibration may take place starting in the unscheduled resources 215 and extend into the SSB resources 212 or the calibration may take place starting in the SSB resources 212 and extend into the unscheduled resources 215.

Figure 2C:
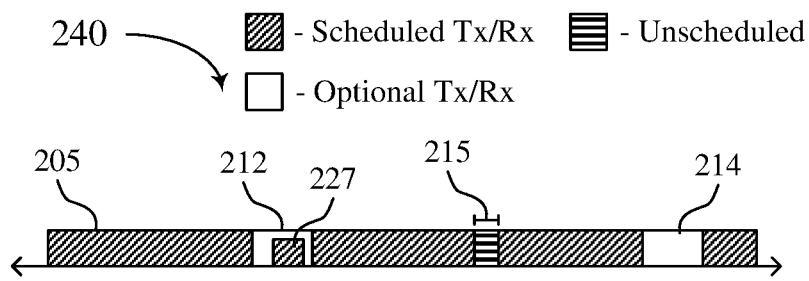

FIG. 2C is a schematic diagram of a protocol timeline 240 for a UE 115 illustrating scheduled Tx/Rx resources 205, SSB resources 212, RACH resources 214, unscheduled resources 215, and resources for scheduled DL grant 227, according to one example embodiment. Because the scheduled DL grant (resources for scheduled DL grant 227) may overlap the SSB resources 212, the UE 115 performs calibration during the RACH resources 214, according to one embodiment.

Figure 2D:
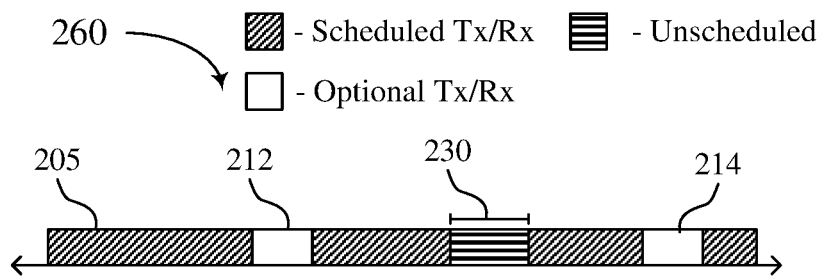

FIG. 2D is a schematic diagram of a protocol timeline 260 for a UE 115 illustrating scheduled Tx/Rx resources 205, SSB resources 212, RACH resources 214, and unscheduled resources 230, according to one example embodiment. A UE 115 may identify each of the SSB resources 212, RACH resources 214, and unscheduled resources 230 as calibration/measurement opportunities. For example, each of the SSB resources 212, RACH resources 214, and unscheduled resources 230 represent resources where a UE 115 may perform calibration/measurements. In one embodiment, the UE 115 selects the unscheduled resources 230 with a higher priority than other optional Tx/Rx resources.

According to one embodiment, the unscheduled resources 230 represent a gap scheduled or configured by a scheduling entity or a protocol used for an air interface. For example, the unscheduled resources 230 may correspond to a power amplifier (PA) calibration gap for calibrating a power amplifier. In one embodiment, the UE 115 uses a PA calibration gap for calibrating a transceiver chain. In one embodiment, a UE 115 may use a PA calibration gap for purposes other than those configured by the network. For example, if the PA calibration gap is configured for calibration of a PA, the UE 115 may instead use the gap for calibrations of an I Q mismatch, MPE requirements, or other impairments not affecting the PA. In one embodiment, if an MPE or I Q mismatch calibration is needed but a PA calibration is not, the UE 115 may repurpose a PA calibration gap for the MPE or I Q mismatch calibration.

When a UE 115 is in an 'Active-mode', strict timing requirements may be imposed to minimize device outage/data-loss. However, if a UE 115 is experiencing a heavy UL/DL load, there may be little or no opportunities for calibration. By allowing a UE to leverage optional Tx/Rx resources the UE 115 may be able to maintain the timing requirements, MPE requirements, or the like. Otherwise throughput with the network may be reduced or the device may be at risk of violating MPE requirements. As discussed herein, in at least one embodiment, SSB opportunities may be leveraged when the network schedules a suitable number of consecutive SSB symbols, the device does not expect to do measurements on a particular SSB, and there is no DL scheduled, or expected to be scheduled, for the device on that SSB (for example, the SSB corresponds to a non-serving beam). Similarly, in at least one embodiment, RACH opportunities may be leveraged when the network scheduled a suitable number of consecutive RACH symbols, a device does not expect to transmit on that particular RACH symbol, and there is no UL scheduled for the device on that RACH slot.

Figure 3:
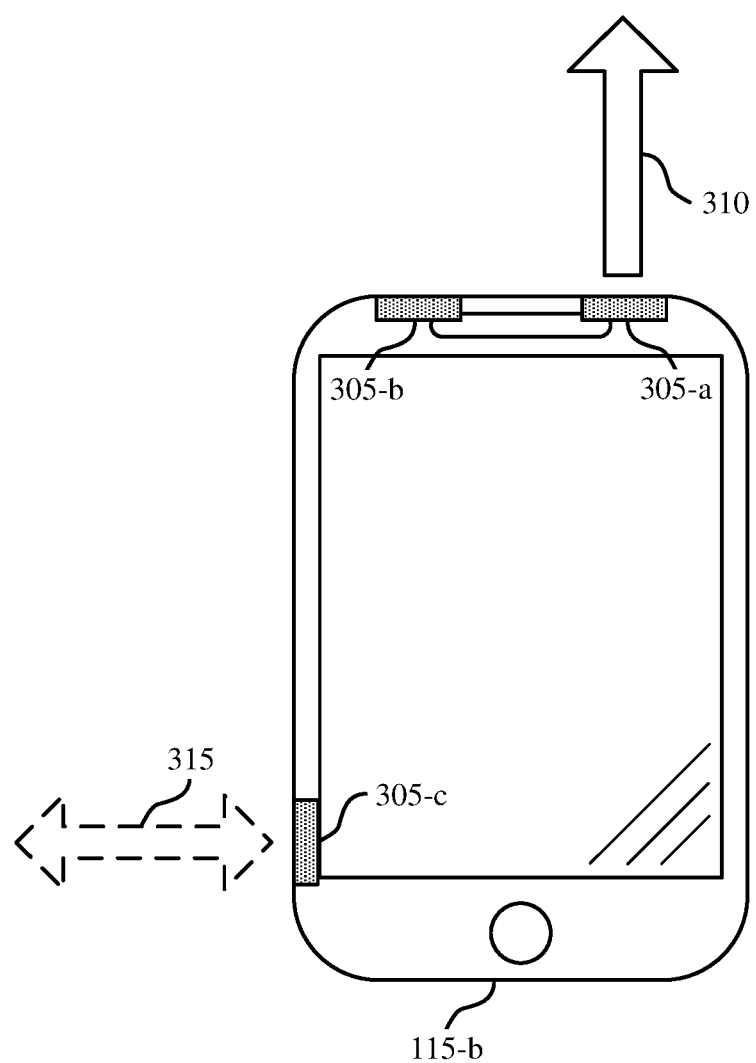
FIG. 3 illustrates a schematic diagrams of an example calibration process in accordance with aspects of the present disclosure.

FIG. 3 illustrates an example of a UE 115-b that utilizes external loopback in accordance with aspects of the present disclosure. A calibration process may be performed by the UE 115-b, which may be an example of a UE 115 as described with reference to FIGS. 1 and 2. UE 115-b may have previously connected to and synchronized with a network. The UE 115-b may identify a calibration opportunity. If the UE 115-b is in need of a calibration using external loopback, the UE 115-b may then transmit a calibration signal 310 by at least one antenna port 305 during an identified calibration opportunity. The calibration signal 310 may be transmitted as a full calibration signal (e.g., across a system bandwidth) or a partial calibration signal (across one or more sub-portions of a system bandwidth). This calibration opportunity may be identified based on a protocol timeline constructed by the UE 115-b based on UL/DL grants, system configuration, and/or a protocol that applies to the air interface. The UE 115-b may transmit a calibration signal 310 using antenna port 305-a in order to perform calibration for a transceiver chain that utilizes antenna port 305-a. This may allow antenna port 305-a to determine parameters for the transceiver chain. In some cases, a device other than UE 115-b may receive the calibration signal 310, and may transmit information 315 corresponding to a measurement of the calibration signal 310 to UE 115-b in response. UE 115-b may receive the transmission indicating the measurements and may calibrate the transceiver chain based on the measurement. In other cases, a different antenna port 305 at UE 115-b may receive the calibration signal 310. For example, if antenna port 305-a transmits the calibration signal 310, antenna port 305-b may receive the calibration signal 310. In these cases, UE 115-b may measure a parameter for the calibration signal 310 and calibrate the transceiver chain based on the measurement.

Figure 4:
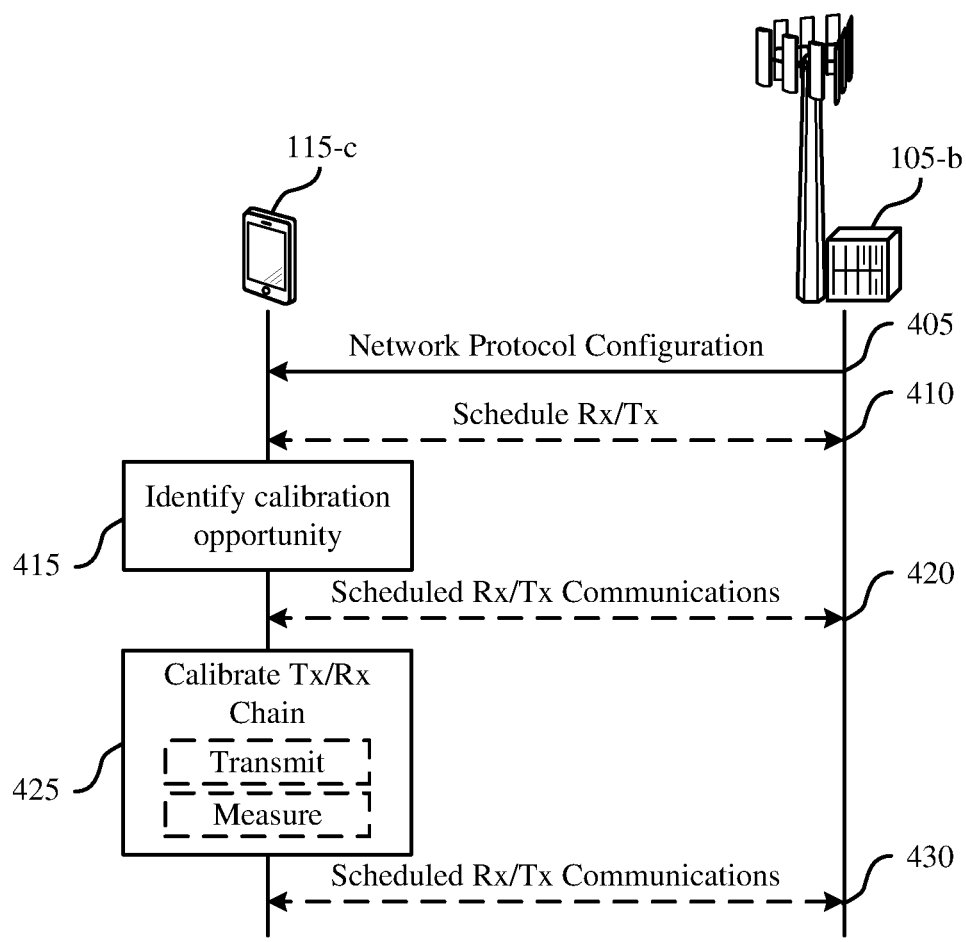
FIG. 4 illustrates an example of a process flow that supports identifying a calibration opportunity in accordance with aspects of the present disclosure.

FIG. 4 illustrates an example of a process flow 400 that supports identifying calibration opportunities determining a time gap for PA calibration in accordance with aspects of the present disclosure. Process flow 400 may include UE 115-c and base station 105-b, which may be examples of the corresponding devices described with reference to FIGS. 1, 2, and 3. Alternative examples of the following may be implemented, where some procedures are performed in a different order than described or not performed at all. In some cases, procedures may include additional features not mentioned below, or further procedures may be added.

At 405, base station 105-b may transmit information including an indication of network protocol configuration to the UE 115-c (the UE 115-c receives the information including the indication of the network protocol configuration). The information may include system information, such as system information in a SIB. The information may be transmitted/received within PBCH, PDCCH, PDSCH, or other physical channel. In one embodiment, the information may include a configuration for SSB symbols, RACH symbols, numerology for frame structure, or other details of a current network configuration.

At 410, the base station 105-b and UE 115-c optionally communicate to schedule Rx/Tx communications. For example, the base station 105-b may transmit, and the UE 115-c may receive, UL and DL grants. As another example, the UE 115-c may transmit RACH preambles, BSRs, or otherwise request to send UL data.

At 415, the UE 115-c identifies one or more calibration opportunities. In one embodiment, the UE 115-c may have rules or circuitry for interpreting network protocol information and/or scheduled Rx/Tx in light of a protocol used for an air interface between the UE 115-c and base station 105-b. For example, the UE 115-c may include software or processing circuitry that complies with the protocol and thus can determine resources used for various signals or communications in light of network protocol configuration and scheduling.

The UE 115-c may construct a protocol timeline to identify resources for scheduled transmissions or reception by the UE 115-c, resources for optional transmission or reception by the UE 115-c, or resources where the UE 115-c has no corresponding scheduled or optional transmission or reception. The UE 115-c may also identify scheduled gaps for allowed calibrations or measurements. As discussed herein, the UE 115-c may identify which resources are available for calibration of a transceiver chain without interrupting network communications. For example, if a UE 115-c does not perform a transmission or monitoring during a scheduled resource, the network may be required to reschedule those resources or perform other actions which reduce network throughput or performance. On the other hand, if the UE 115-c is able to identify resources for optional transmission or reception, the UE 115-c may instead perform calibrations to keep the UE 115-c operating near its peak capabilities without violating important requirements such as MPE requirements. The UE 115-c may identify one or more SSB symbols or RACH symbols as well as a set of subcarriers or all subcarriers available for calibration.

At 420, if there are scheduled Rx/Tx communications from the optional scheduling at 410 (or other scheduling), the UE 115-c and base station 105-b may communicate according to the scheduled Rx/Tx communications. For example, the UE 115-c may send UL or sidelink (direct peer-to-peer) communications or receive DL or sidelink communications. The base station 105-b may send DL signals or receive UL signals.

At 425, the UE 115-c calibrates a Tx/Rx (transceiver) chain of the UE 115-c. The UE 115-c may include multiple transceiver chains and may calibrate one or more or all of them during a calibration opportunity. The UE 115-c may calibrate the transceiver chain during one or more resources identified as calibration opportunities at 415. For example, the UE 115-c may perform calibrations using internal loopback or external loopback. The calibrations may include transmissions or measurements that cannot be performed while the transceiver chain is sending or receiving mission mode communications (e.g., communications for services between the UE 115-c and the base station 105-b or other communication device). For example, another transceiver chain may be used for communications in a different band concurrently with the calibration, but the transceiver chain that is being calibrated may be unable to do so. The calibration at 425 may optionally include transmissions and measurements within the calibration opportunity. In one embodiment, any transmissions are kept within maximum power levels as required by the network protocol configuration and/or corresponding protocol or agreed standard.

At 430, if there are scheduled Rx/Tx communications from the optional scheduling at 410 (or other scheduling), the UE 115-c and base station 105-b may communicate according to the scheduled Rx/Tx communications. For example, the UE 115-c may send UL or sidelink (direct peer-to-peer) communications or receive DL or sidelink communications. The base station 105-b may send DL signals or receive UL signals. In one embodiment, the calibration at 425 may take place within resources surrounded on each side in time (and/or frequency) by scheduled (or mission mode) communications. Thus, the UE 115-c may identify calibration opportunities even when it is being heavily scheduled for UL, DL, or sidelink communications.

Figure 5A:
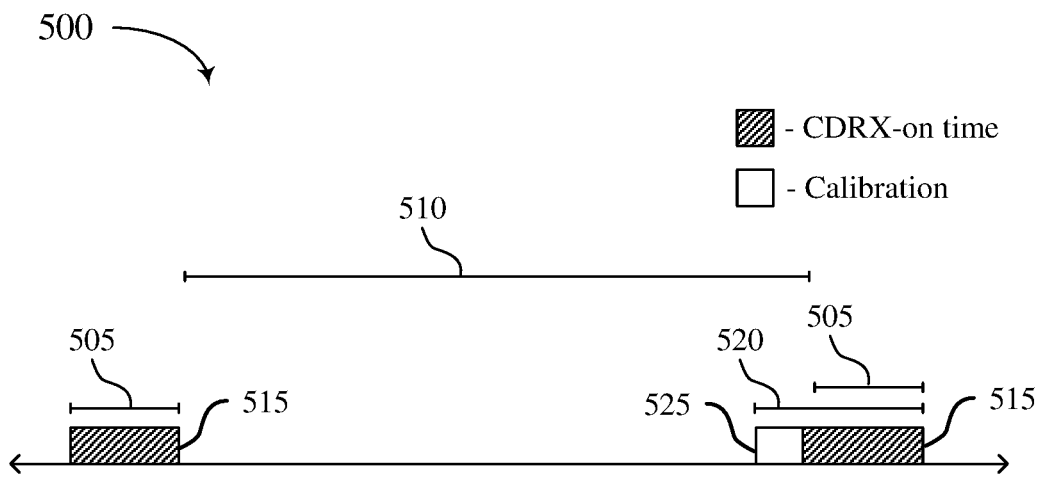
FIGS. 5A and 5b illustrate schematic diagrams of example protocol timelines supporting identifying calibration opportunities in accordance with aspects of the present disclosure.
Figure 5B:
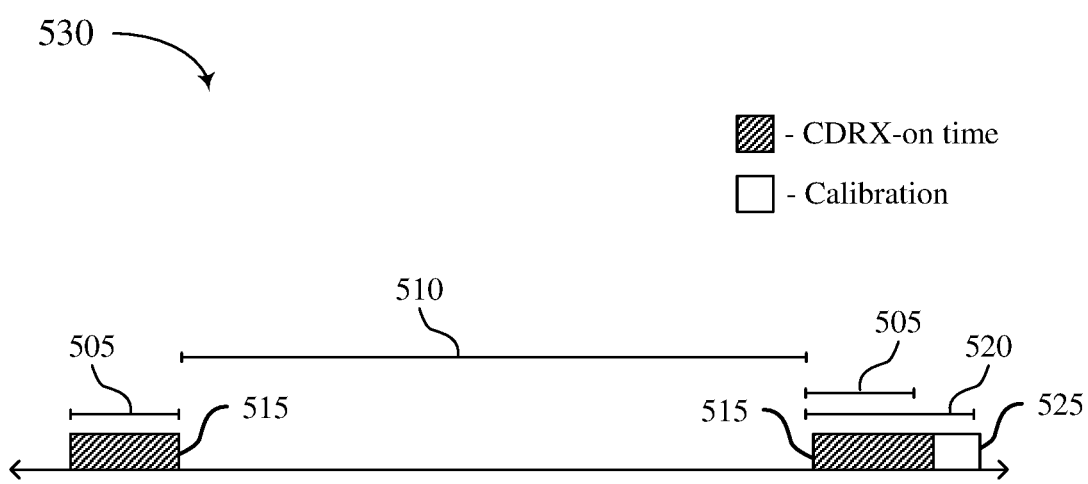

FIGS. 5A-5B schematically illustrate calibration opportunities for a discontinuous reception (DRX) mode, according to example embodiments. In a DRX mode, a UE 115 may be configured to sleep, or enter a low power mode, for a period of time and then wake up during a DRX-on time to listen for potential DL transmissions or request any needed UL transmission. In connected mode DRX (CDRX), the UE 115 may remain in an RRC connected mode but still sleep for periods of time to reduce power consumption. For example, the UE 115 may wake up during a DRX-on time, listen for PDCCH or PDSCH scrambled with a paging identifier and then process the PDCCH or PDSCH to determine whether there is data or instruction applicable to the UE 115. If there is data or instruction applicable to the UE 115, the UE 115 may transition out of the CDRX mode to monitor for signals or transmit signals. If there is no further transmission nor reception to be done by the UE 115, it may return to a sleep mode or low power state until the next DRX-on time. The DRX-on time may correspond to a window in time where the UE 115 is expected to be available to monitor for or send transmissions. Thus, DRX modes or CDRX modes may provide more opportunistic scheduling of a UE 115 to allow for times when the UE 115 is not expected to be listening for transmissions.

FIG. 5A is a schematic diagram of a protocol timeline 500 for a UE 115 during a CDRX mode. In the CDRX mode, the timeline 500 is divided into CDRX-on windows 505 and a CDRX-off windows 510. During the CDRX-on windows 505 the UE 115 may be expected to monitor for or send transmission. The CDRX-on windows 505 may represent time periods where the UE 115 is unable to perform a full calibration (although a partial calibration may be possible in some embodiments) because a transceiver chain is busy doing monitoring or transmission. The protocol timeline 500 illustrates CDRX-on resources 515 where a transceiver chain of the UE 115 is busy.

The CDRX-off windows 510 may correspond to times where the UE 115 is permitted, but perhaps not required, to sleep. By sleeping or entering a low power state during the CDRX-off windows 510, the UE 115 may obtain significant power saving. The protocol timeline 500 illustrates an expanded on window 520 that includes a CDRX-on window 505 but extends into a CDRX-off window 510. The expanded on window 520 allows a UE 115 to perform calibration in calibration resources 525 without conflicting with CDRX-on resources 515. The calibration resources 525 are next to the CDRX-on resources 515 to keep the expanded on window 520 short to minimize a length of time the UE 115 is in a higher power state. By using the expanded on window 520 for both CDRX-on resource 515 and calibration resources 525, the UE 115 can reduce on-off cycles and also minimize an amount of on-time. For example, if the calibration resources 525 occurred in the middle of the CDRX-off window 510 the UE 115 may be required to transition to an on state and then to an off state an additional time. Because both time in a higher state and transitions between power states require more power than remaining in a low power state, the calibration resources 525 neighboring the CDRX-on resources 515 may provide optimal or improved power saving while still allowing the UE 115 to obtain or maintain a calibrated transceiver chain.

FIG. 5B is a schematic diagram of a protocol timeline 530 for a UE 115 during a CDRX mode. In the CDRX mode, the timeline 530 is divided into CDRX-on windows 505 and a CDRX-off windows 510. During the CDRX-on windows 505 the UE 115 may be expected to monitor for or send transmission. The CDRX-on windows 505 may represent time periods where the UE 115 is unable to perform a full calibration (although a partial calibration may be possible in some embodiments) because a transceiver chain is busy doing monitoring or transmission. The protocol timeline 530 illustrates CDRX-on resources 515 where a transceiver chain of the UE 115 is busy. The illustrated timeline 530 is similar to the timeline 500 of FIG. 5A except that the calibration resources 525 follow the CDRX-on resource 515 instead of precede them.

Based on the above embodiments and other contemplated embodiments, a device may preferentially perform measurements or calibration operations either or both (a) just before the start of CDRX off-time or (b) just prior to waking up at a CDRX on-time. This may help to minimize the power consumption and overhead associated with waking up the device specifically or only for measurements or calibrations.

Figure 6:
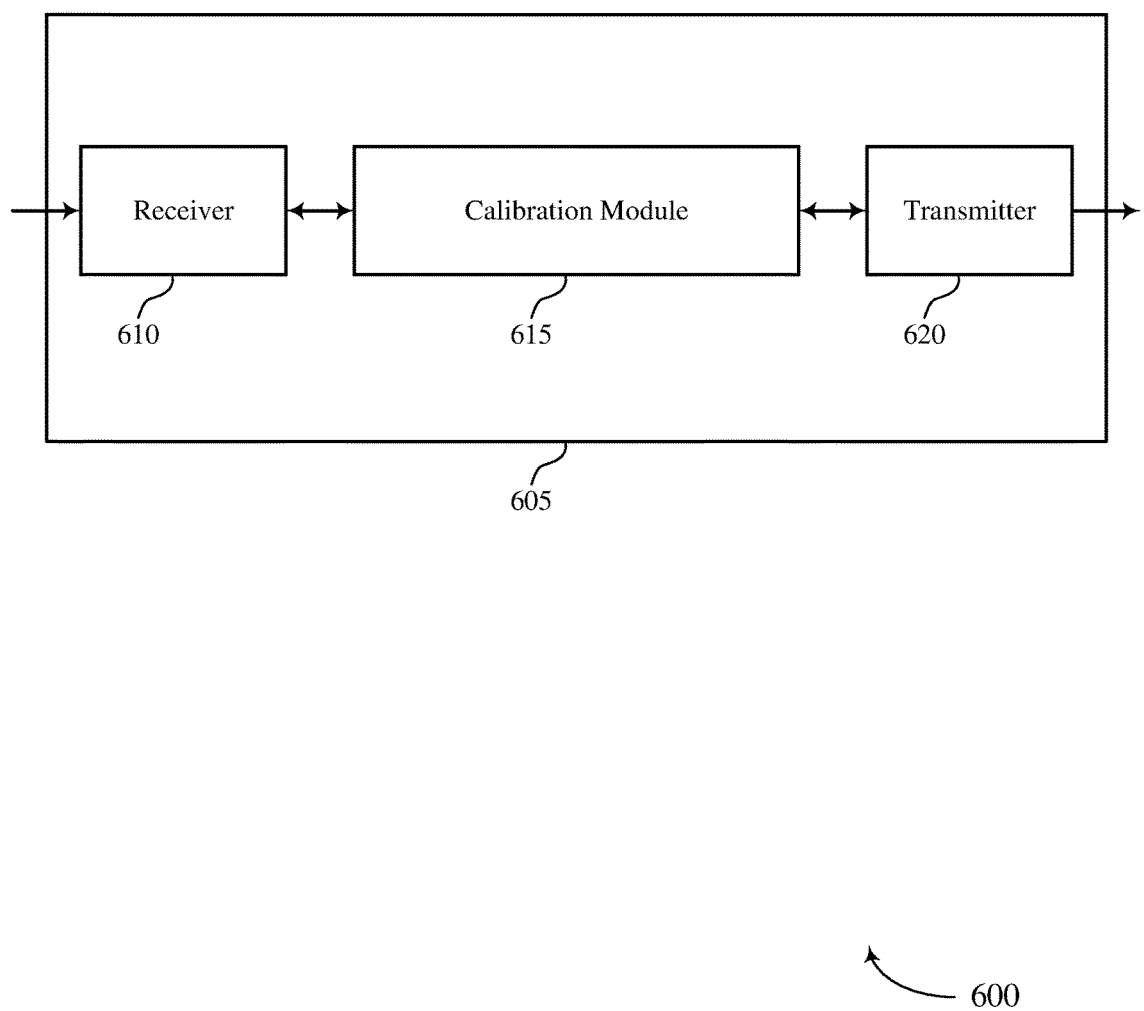
FIGS. 6 and 7 show block diagrams of devices that support identifying calibration opportunities in accordance with aspects of the present disclosure.

FIG. 6 shows a block diagram 600 of a device 605 that supports identifying calibration opportunities in accordance with aspects of the present disclosure. The device 605 may be an example of aspects of a UE 115 as described herein. The device 605 may include a receiver 610, a calibration module 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to identifying calibration opportunities, etc.). Information may be passed on to other components of the device 605. The receiver 610 may be an example of aspects of the transceiver 920 described with reference to FIG. 9. The receiver 610 may utilize a single antenna or a set of antennas.

The calibration module 615 may receive information about a network protocol configuration and/or scheduled transmissions or receptions for a UE. Based on this information, the calibration module 615 may identify calibration opportunities and calibrate a transceiver chain during those calibration opportunities. The calibration module 615 may be an example of aspects of the calibration module 910 described herein.

The calibration module 615, or its sub-components, may be implemented in hardware, code (e.g., software or firmware) executed by a processor, or any combination thereof. If implemented in code executed by a processor, the functions of the calibration module 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The calibration module 615, or its sub-components, may be physically located at various positions, including being distributed such that portions of functions are implemented at different physical locations by one or more physical components. In some examples, the calibration module 615, or its sub-components, may be a separate and distinct component in accordance with various aspects of the present disclosure. In some examples, the calibration module 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
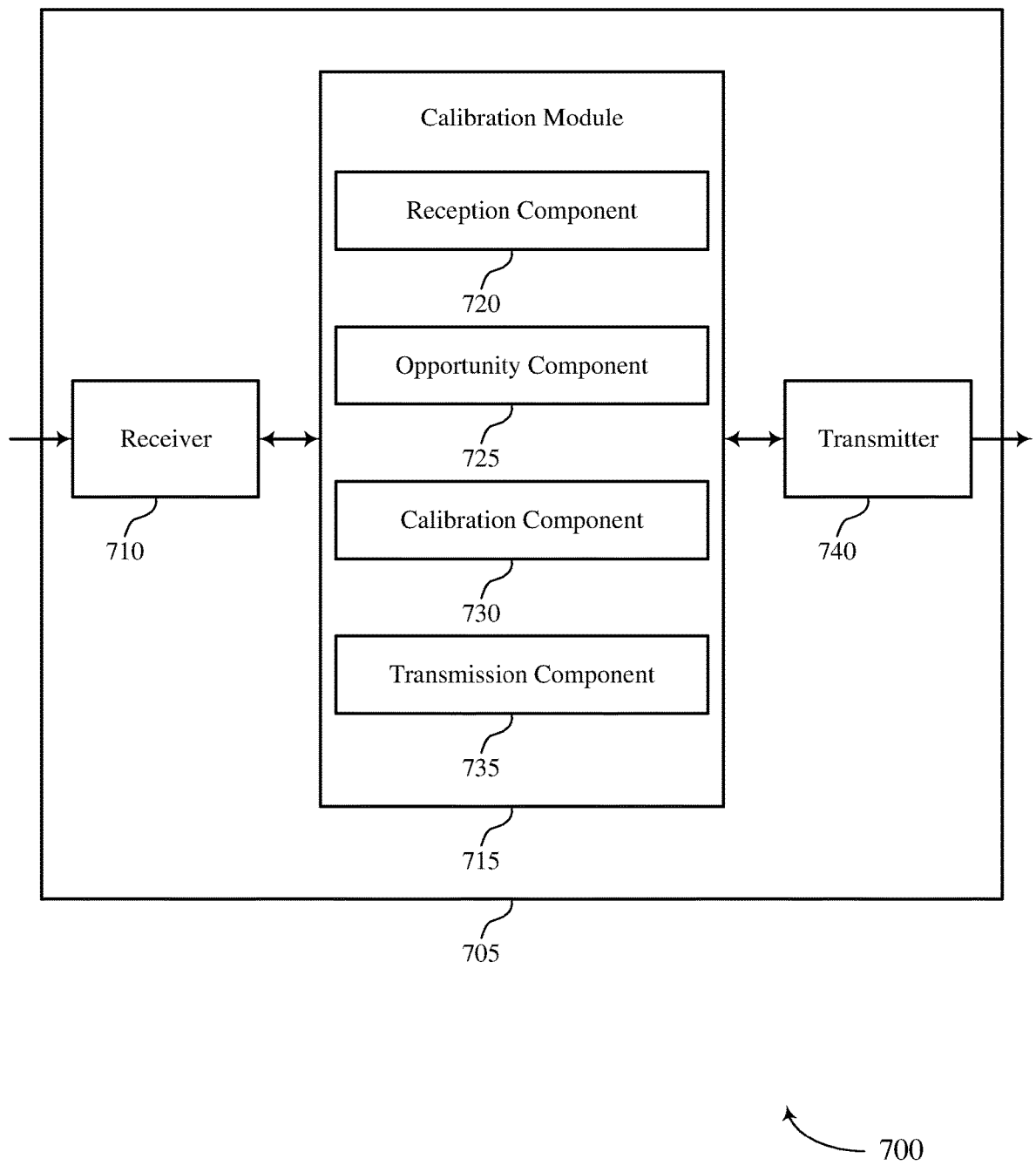

FIG. 7 shows a block diagram 700 of a device 705 that supports identifying calibration opportunities in accordance with aspects of the present disclosure. The device 705 may be an example of aspects of a device 605 or a UE 115 as described herein. The device 705 may include a receiver 710, a calibration module 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to determining a calibration opportunity, etc.). Information may be passed on to other components of the device 705. The receiver 710 may be an example of aspects of the transceiver 920 described with reference to FIG. 9. The receiver 710 may utilize a single antenna or a set of antennas.

The calibration module 715 may be an example of aspects of the calibration module 615 as described herein. The calibration module 715 may include a reception component 720, an opportunity component 725, a calibration component 730, and a transmission component 735. The calibration module 715 may be an example of aspects of the calibration module 910 described herein.

The reception component 720 may receive, at a UE, an indication of a network configuration or scheduled Tx/Rx resources for the UE. The opportunity component 725 may identify one or more calibration opportunities. The calibration component 730 may calibrate a transceiver chain during the identified calibration opportunities. The transmission component 735 may transmit, by the at least one antenna port, a signal using the calibrated transceiver chain.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
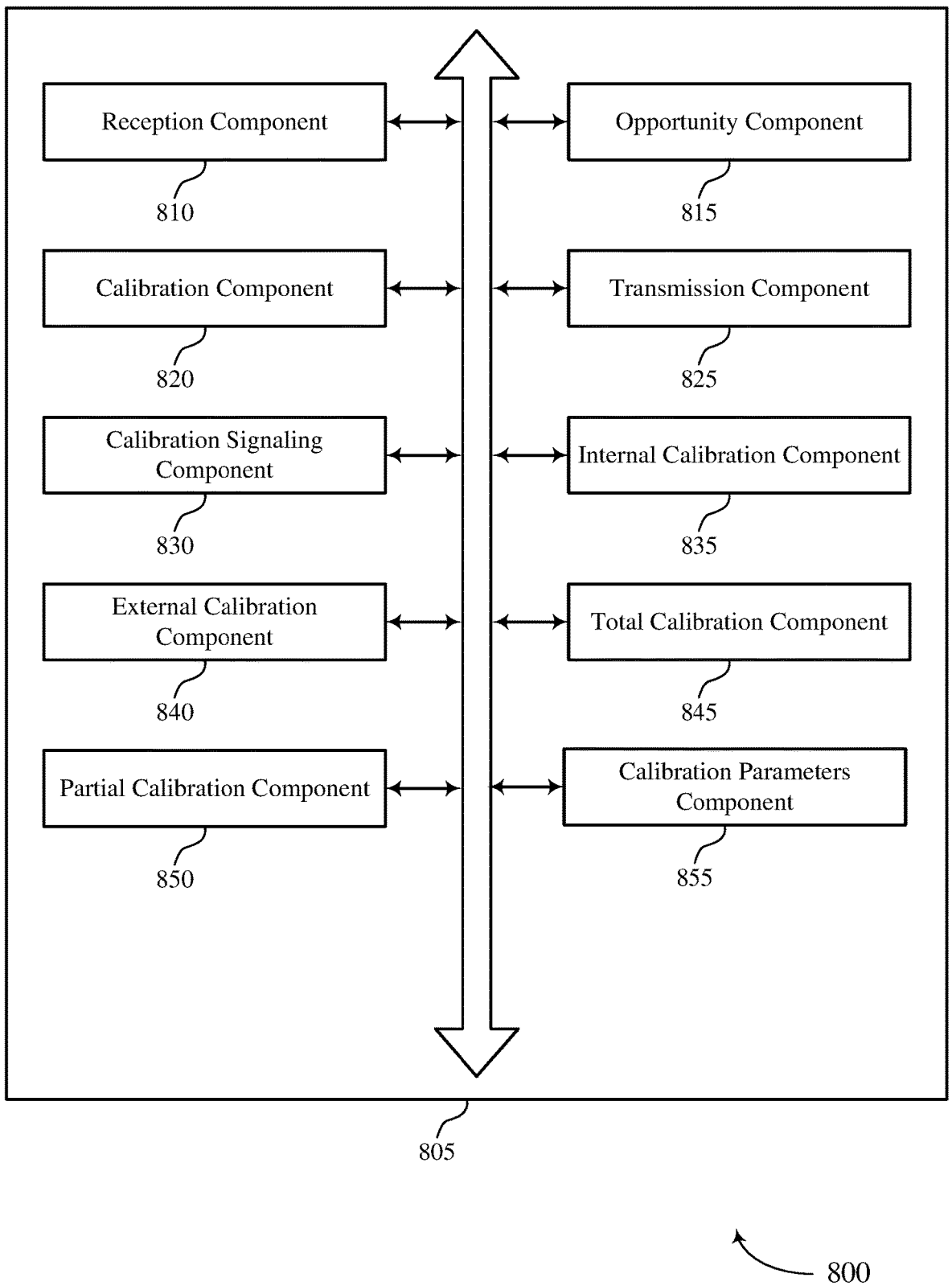
FIG. 8 shows a block diagram of a calibration module that supports identifying calibration opportunities in accordance with aspects of the present disclosure.

FIG. 8 shows a block diagram 800 of a calibration module 805 that supports determining a calibration opportunity in accordance with aspects of the present disclosure. The calibration module 805 may be an example of aspects of a calibration module 615, a calibration module 715, or a calibration module 910 described herein. The calibration module 805 may include a reception component 810, an opportunity component 815, a calibration component 820, a transmission component 825, a calibration signaling component 830, an internal calibration component 835, an external calibration component 840, a total calibration component 845, a partial calibration component 850, and a calibration opportunity parameter component 855. Each of these modules may communicate, directly or indirectly, with one another (e.g., via one or more buses).

The reception component 810 may receive, at a UE, an indication of a network configuration or scheduled Tx/Rx resources for the UE. The opportunity component 815 may identify one or more calibration opportunities. The calibration component 820 may calibrate a transceiver chain during the identified calibration opportunities. The transmission component 825 may transmit, by the at least one antenna port, a signal using the calibrated transceiver chain.

In some cases, calibrating includes the calibration signaling component 830 transmitting, by the transceiver chain using the at least one antenna port, a calibration signal during the calibration opportunity. In some cases, calibrating the transceiver chain includes the internal calibration component 835 performing calibration using internal loopback. In some cases, calibrating the transceiver chain includes the external calibration component 840 performing calibration using external loopback.

In some cases, the calibration opportunity is an example of either a total calibration opportunity or a partial calibration opportunity. If the calibration opportunity is a total calibration opportunity, the total calibration component 845 may refrain from transmitting or receiving a non-calibration signal using any other antenna port of the UE during the calibration opportunity. If the calibration opportunity is a partial calibration opportunity, the partial calibration component 840 may transmit or receive a non-calibration signal using at least one other antenna port of the UE during the calibration opportunity.

The calibration parameters component 855 may determine one or more of a minimum duration or a minimum bandwidth (number of subcarriers) needed to perform a total or partial calibration. For example, the calibration parameters component 855 may determine a threshold corresponding to a minimum number of symbols needed in order to perform one or more types of calibration.

Figure 9:
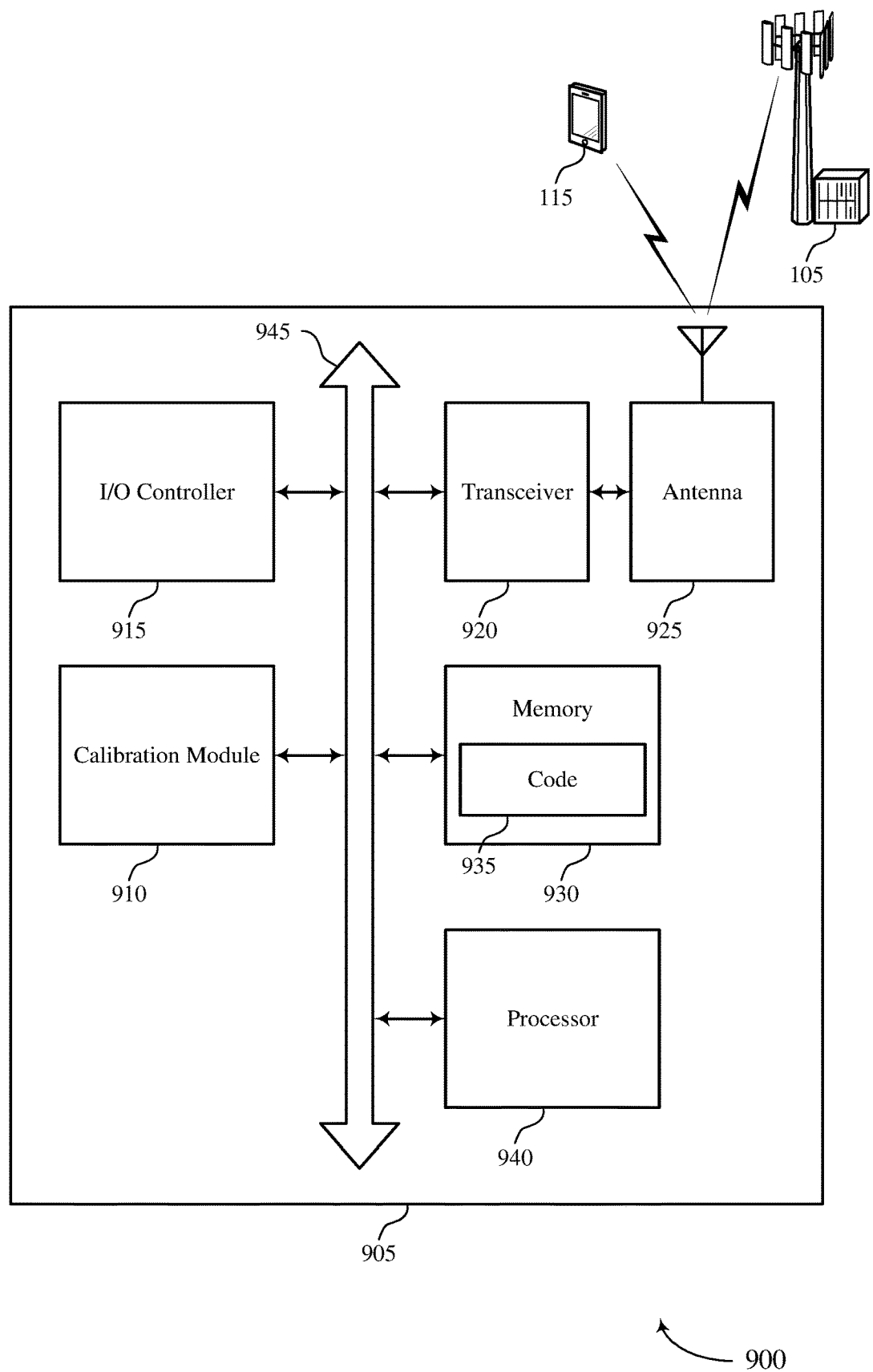
FIG. 9 shows a diagram of a system including a device that supports identifying calibration opportunities in accordance with aspects of the present disclosure.

FIG. 9 shows a diagram of a system 900 including a device 905 that supports identifying calibration opportunities in an online or connected mode with a network in accordance with aspects of the present disclosure. The device 905 may be an example of or include the components of device 605, device 705, or a UE 115 as described herein. The device 905 may include components for bi-directional voice and data communications including components for transmitting and receiving communications, including a calibration module 910, an I/O controller 915, a transceiver 920, an antenna 925, memory 930, and a processor 940. These components may be in electronic communication via one or more buses (e.g., bus 945).

The calibration module 910 may receive, at the UE, information about a protocol configuration or scheduled communications and identify one or more calibration opportunities. The calibration module 910 may calibrate a transceiver chain of the device 905 and utilize the calibrated transceiver chain for wireless communications. In one embodiment, the calibration module 910 may be implemented by the processor 940 and/or the memory 935.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting determining a calibration opportunity).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
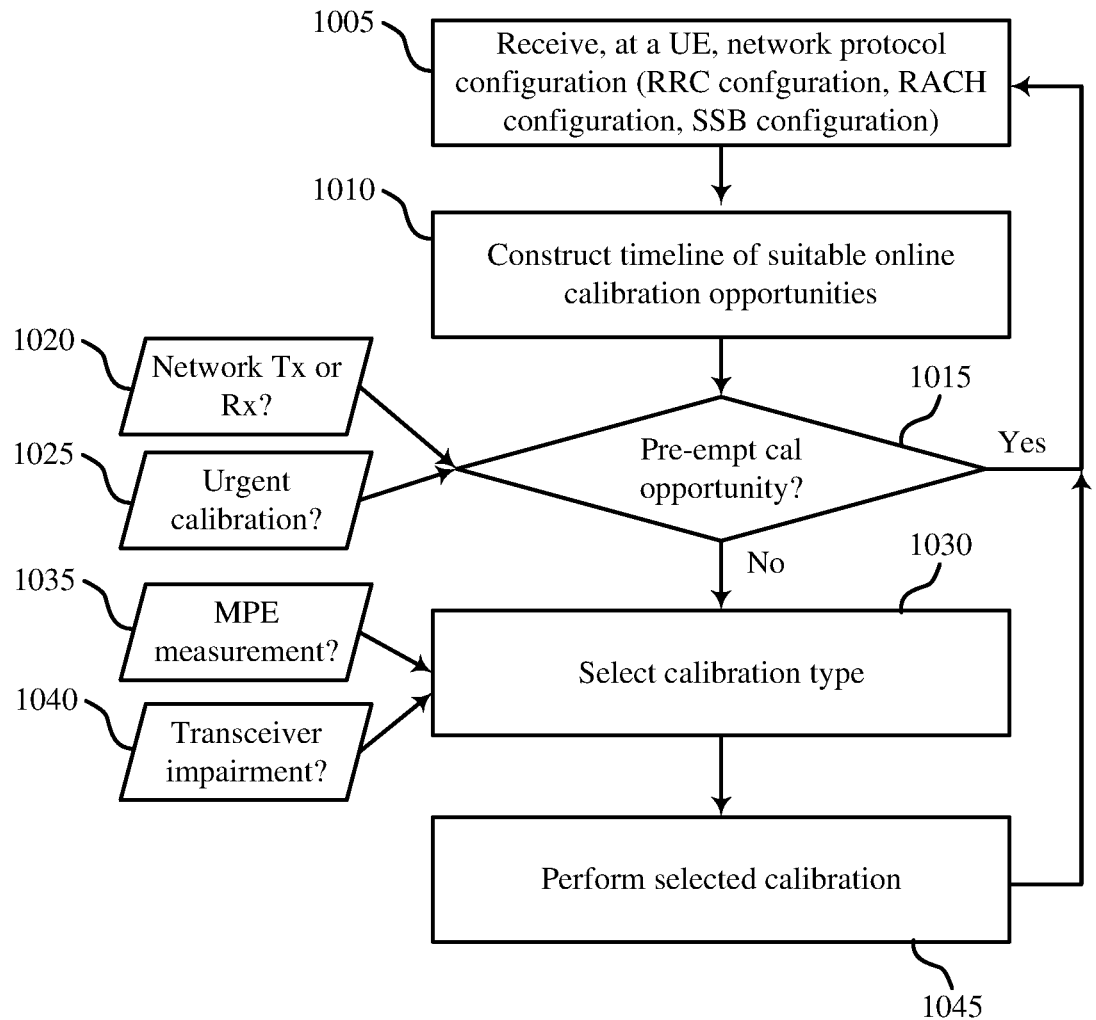
FIGS. 10, 11, 12, and 13 show flowcharts illustrating methods that support identifying calibration opportunities in accordance with aspects of the present disclosure.

FIG. 10 shows a flowchart illustrating a method 1000 that supports identifying calibration opportunities in accordance with aspects of the present disclosure. The operations of method 1000 may be implemented by a UE 115 or its components as described herein. For example, the operations of method 1000 may be performed by a calibration module as described with reference to FIGS. 5-9. In some examples, a UE may execute a set of instructions to control the functional elements of the UE to perform the functions described below. Additionally or alternatively, a UE may perform aspects of the functions described below using special-purpose hardware. The method 1000 may be combined with other aspects, processes, or embodiments discussed in relation to FIGS. 2A, 2B, 2C, 2D, 3, 4, 5A, 5B, 11, 12, and/or 13.

At 1005, the UE 115 receives a network protocol configuration. The UE 115 may receive the network protocol configuration in an information message from a network entity, such as a base station 105. The network protocol configuration may include an RRC configuration, RACH configuration, SSB configuration, framework numerology, or the like. In one embodiment, the UE 115 receives the network protocol configuration in an SIB or other transmission from a scheduling entity.

At 1010, the UE 115 constructs a timeline of potential online calibration opportunities. The UE 115 may construct a protocol timeline based on the network protocol configuration to determine resources where calibration is not available and resources where calibration might be available. The timeline, or timing of potential calibration opportunities in the timeline, may be determined based on preconfigured rules or processes that comply with a wireless protocol used on an interface between the UE 115 and the base station 105. In one embodiment, the potential calibration opportunities include resources during one or more SSB symbols or one or more RACH symbols.

At 1015, the UE 115 determines whether to pre-empt a potential calibration opportunity by not using the potential calibration opportunity for calibration. The UE 115 may determine whether to pre-empt the potential calibration opportunity at 1015 based on a current status of the UE 115 or scheduled communications. For example, the UE 115 may determine whether a network Tx or Rx is scheduled 1020 based on one or more messages indicating an UL or a DL grant for the UE 115. Thus, if the UE 115 identifies an SSB symbol or RACH symbol as a potential calibration opportunity, the UE 115 may pre-empt that opportunity for a scheduled transmission or reception. As another example, the UE 115 may determine whether there is an urgent need for calibration 1025. For example, the UE 115 may be configured (by a network, protocol rules, or a device manufacturer) with time thresholds for how often a transceiver chain needs to be calibrated in different ways. For example, there may be a threshold for how often an MPE calibration, transceiver impairment calibration, or other type of calibration should be performed to avoid violating requirements or maintain acceptable operation of the UE 115. If one of these thresholds is predicted to be violated at a certain time, the UE 115 may determine not to pre-empt a calibration opportunity to maintain compliance with the threshold. For example, if an impairment is severe or a threshold is about to expire, the UE 115 may use one or more RACH or SSB an or symbols for calibration even if there is also a scheduled Rx or Tx during that symbol. If the UE 115 determines that the potential calibration opportunity should be pre-empted (Yes at 1015), the UE 115 may perform other operations than calibration and return to receiving network protocol configuration at 1005 and/or constructing a timeline at 1010.

At 1030, UE 115 selects a calibration type for one or more of the calibration opportunities. The UE 115 may select the calibration type at 1030 if the UE 115 determines not to pre-empt the potential calibration opportunity (No at 1015). The UE 115 may have a set of calibration types that it can perform on a transceiver chain. For example, the UE 115 may periodically, or as needed, calibrate a transmit power or beam width to comply with MPE requirements, an IQ mismatch, a power amplifier non-linearity, or the like. In one embodiment the UE 115 selects between a MPE measurement 1035 calibration type or a transceiver impairment 1040 calibration type. For example, the type of calibration selected may be based on a current priority (which calibration is the closest to the end of a corresponding threshold) or a general priority (MPE requirements may be higher priority than calibrations that maintain/improve device performance for data throughput).

At 1045, the UE 115 performs the selected calibration(s) in the one or more selected calibration opportunities. The UE 115 may perform the calibration so that it remains within the resources (time and/or frequency) resources corresponding to the calibration opportunity. For example, the UE 115 may start and finish the calibration process to avoid conflict with transmissions or other signaling.

Figure 11:
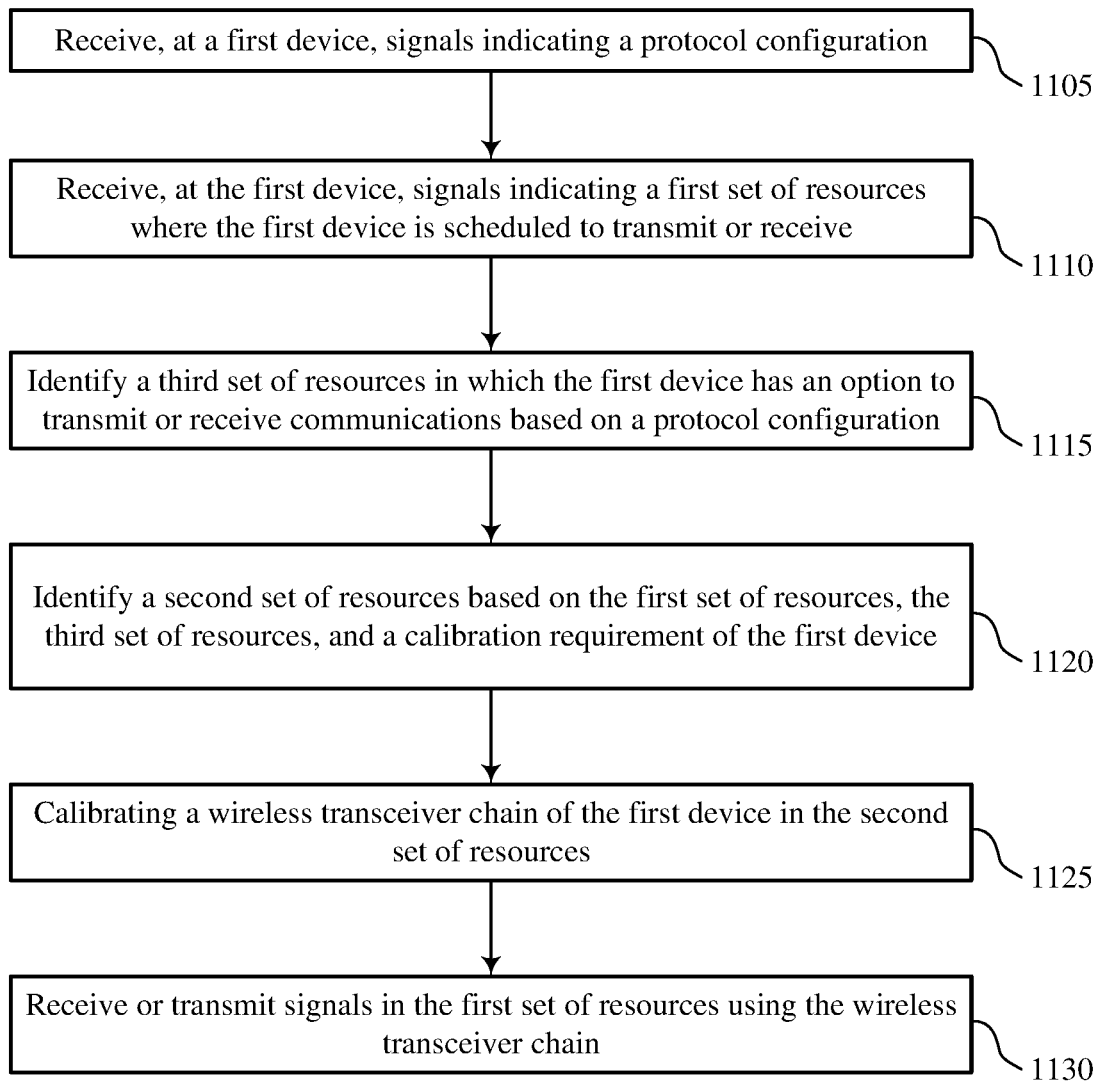

FIG. 11 shows a flowchart illustrating a method 1100 that supports identifying calibration opportunities in accordance with aspects of the present disclosure. The operations of method 1100 may be implemented by a UE 115 or its components as described herein. For example, the operations of method 1100 may be performed by a calibration module as described with reference to FIGS. 6-9. The UE 115 may include a first device. In some examples, a UE may execute a set of instructions to control the functional elements of the UE to perform the functions described below. Additionally or alternatively, a UE may perform aspects of the functions described below using special-purpose hardware. The method 1100 may be combined with other aspects, processes, or embodiments discussed in relation to FIGS. 2A, 2B, 2C, 2D, 3, 4, 5A, 5B, 10, 12, and/or 13.

At 1105, a first device receives signals indicating a protocol configuration. The protocol configuration may include one or more of a RRC configuration, a RACH configuration, or a SSB configuration. The protocol configuration may be received on signals from a network or scheduling entity. For example, the protocol configuration may be received in a SIB or other control information.

At 1110, the first device receives signals indicating a first set of resources where the UE is scheduled to transmit or receive communications. The signals indicating the first set of resources may include UL or DL grants received from a second device. The first device may operate as a scheduled entity and receive the signals from a scheduling entity, such as a base station 105 or a network node.

At 1115, the first device identifies a third set of resources in which the first device has an option to transmit or receive communications based on a protocol configuration. In at least one embodiment, the first device may identify the third set of resources by identifying a location of one or more scheduled SSB symbols. The first device may identify the third set of resources by further determining that a continuous duration of the one or more scheduled SSB symbols together exceeds a threshold. For example, the threshold may correspond to an amount of time that it takes to perform a specific type of calibration. The first device may identify the third set of resources by further identifying that the first device does not expect to process or measure an SSB during the one or more scheduled SSB symbols. The number of symbols during which the first device does not expect to process or measure the SSB may be greater than the threshold. The first device may identify the third set of resources by further identifying that there is no downlink grant scheduled for the first devices during the one or more scheduled SSB symbols.

In at least one embodiment, the first device identifies the third set of resources by identifying one or more RACH symbols. The first device may identify the third set of resources by further determining that a continuous duration of symbols corresponding to the one or more RACH symbols together exceeds a threshold. For example, the threshold may correspond to an amount of time that it takes to perform a specific type of calibration. The first device may identify the third set of resources by further identifying that there is no uplink grant scheduled for the first device during the one or more RACH symbols. The number of symbols during which the first device does not expect to process or measure the SSB may be greater than the threshold.

At 1120, the first device may identify a second set of resources based on the first set of resources, the third set of resources, and a calibration requirement of the first device.

The first device may select a subset of resources from the third set of resources to be used for calibration. For example, the first device may identify whether resources are available for calibration as well as whether calibration is needed. In one embodiment, when a calibration opportunity is available the first device may determine whether to pre-empt calibration by instead performing a transmission or monitoring for a reception during the opportunity. If the device does not have a need for calibration at that time, or within a short time thereafter, the first device may instead wait for a later calibration opportunity. For example, threshold requirements for how often a specific type of calibration is to be performed or information about how severe an impairment of a transceiver chain is may affect whether at least portions of the third resources are selected for calibration. The first device may select one or more available SSB symbols or RACH symbols for performing the calibration.

At 1125, the first device calibrates a wireless transceiver chain of the first device in the second set of resources. The first device may calibrate the wireless transceiver chain within the second set of resources that exclude the first set of resources and include at least a portion of the third set of resources. In one embodiment, the first device calibrates a same transceiver chain that is used for monitoring or transmitting signals that are within the first resources.

In one embodiment, the first device calibrates the transceiver chain using internal loopback.

In one embodiment, the first device calibrates the transceiver chain using external loopback. Calibrating using external loopback includes, in one embodiment, transmitting a signal using a first set of antennas of the first device and measuring characteristics of the signal using a second set of antennas of the first device. The first device may calibrate the transceiver chain based on the characteristics of the signal. The first device may transmit the signal at a power level at or below an agreed or indicated power level corresponding to a frequency band comprising the second resources and protocol requirements. In one embodiment, the first device detects a proximity of an external object based on the measuring and the transceiver chain is calibrated based on the proximity of the external object. For example, the external object may be detected based on external loopback measuring and identified as human tissue based movement. The first device may adjust a transmit power or beam based on the presence of the human tissue to avoid an MPE.

The first device may perform calibration to calibrate a transmit power or beam width to avoid a MPE level. The first device may calibrate to eliminate or reduce an impairment in the transceiver chain. For example, the first device may calibrate to correct a mismatch between an I section of the transceiver chain and a Q section of the transceiver chain. As another example, the first device calibrates to correct a power amplifier non-linearity.

At 1130, the first device receives or transmits signals in the first set of resources. In one embodiment, the same transceiver chain that is calibrated at 1125 is used for communications as 1130. The first resources may be located in the same frequency (subcarriers) before and/or after in time relative to the second resources where calibration occurs. Similarly, the first resources may be located concurrent in time but offset in frequency above and/or below the second resources where calibration occurs. In one embodiment, if a first transceiver chain is used for calibration a different transceiver may be used for communications that are concurrent in time but offset in frequency.

Figure 12:
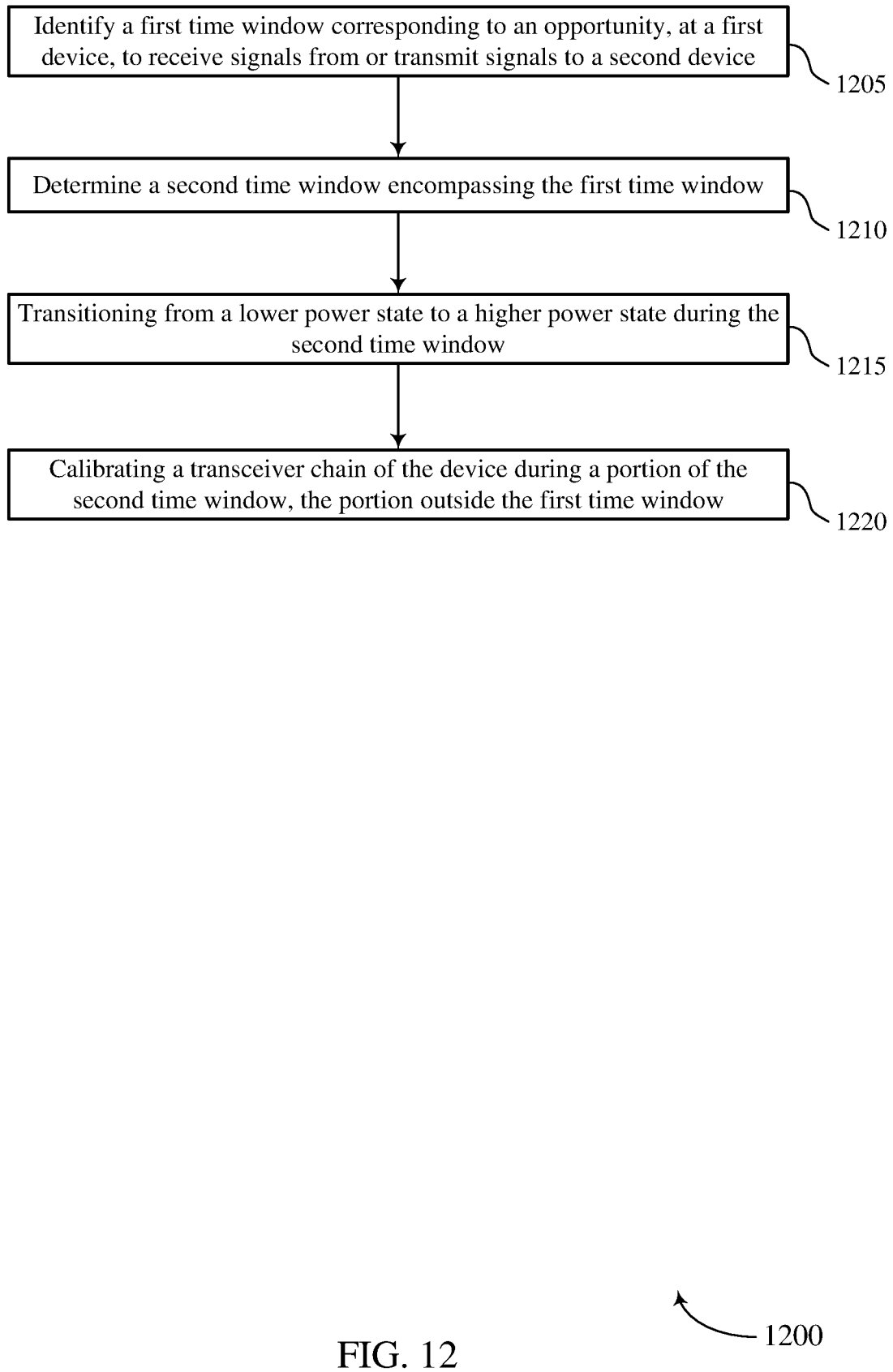

FIG. 12 shows a flowchart illustrating a method 1200 that supports identifying calibration opportunities in accordance with aspects of the present disclosure. The operations of method 1200 may be implemented by a UE 115 or its components as described herein. For example, the operations of method 1200 may be performed by a calibration module as described with reference to FIGS. 6-9. The UE 115 may include a first device. In some examples, a UE may execute a set of instructions to control the functional elements of the UE to perform the functions described below. Additionally or alternatively, a UE may perform aspects of the functions described below using special-purpose hardware. The method 1200 may be combined with other aspects, processes, or embodiments discussed in relation to FIGS. 2A, 2B, 2C, 2D, 3, 4, 5A, 5B, 10, 11, and/or 13.

At 1205, the first device identifies a first time window corresponding to an opportunity to receive signals from or transmit signals to a second device. The first device may identify the first time window based on wireless signals received by the first device that indicate a configuration for the first time window. For example, the wireless signals may configure a DRX mode for the first device. The first time window may correspond to a paging occasion during a DRX mode. For example, the first time window may correspond to a CDRX-on time for a CDRX mode. In one embodiment, the first device may construct a protocol timeline including DRX-on times, DRX-off times, and/or any resources scheduled for transmission or communication during those times. The first device may be a scheduled entity and the first time window may corresponds to resources scheduled by a node or entity of a wireless network.

At 1210, the first devices determines a second time window that includes the first time window. The second time window may be larger than the first time window. The first device may determine the second time window with a length large enough to encompass the first time window and sufficient additional resources to perform a calibration. For example, the second time window may be a length of the first time window plus a threshold time for performing a specific type of calibration. The first device may determine the second time window based on a need for calibration by a transceiver chain of the first device, as well as a length of time it takes to perform the needed calibration. In one embodiment, the second time window starts at a same time as a start of the first time window and ends after the end of the first time window and after resources during which the calibration was performed. In one embodiment, the second time window starts before the first time window and before resources during which the calibration is performed and ends at a same time as the end of the first time window.

At 1215, the first device transitions from a lower power state to a high power state during a second time window. For example, the first device may transition from the lower power state to the high power state and remain in the high power state during the first time window and during a time when the transceiver chain is being calibrated. The lower power state may include a sleep state during which the first device is unable to transmit or receive signals or to perform calibration. The high power mode may include a power mode in which the first device can monitor for or send transmissions and/or perform calibration. Either the low power state or the high power state may include multiple sub states. For example, different levels of high power states may be included in the high power state. Similarly, different levels of low power states may be included in the lower power state.

At 1220, the first devices calibrates a transceiver chain of the first device during a portion of the second time window that is outside the first time window. The portion of the first time window may precede the first time window, follow the first time window, or both precede and follow. For example, a first calibration may occur before the first time window and a second calibration may occur after the first time window. Thus, the calibration may occur before a beginning of the first time window and/or after an ending of the first time window. In one embodiment, calibrating the first device remains in a high power state for a duration of the second time window and transitions to the low power state at an end of the second time window.

Figure 13:
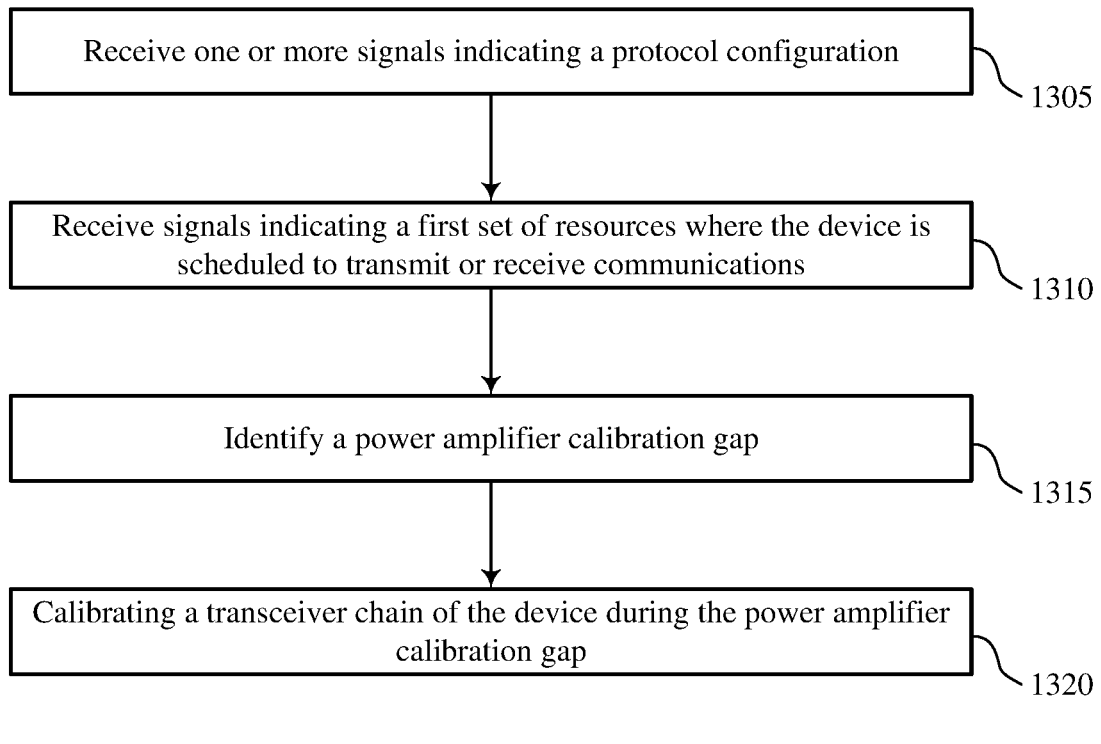

FIG. 13 shows a flowchart illustrating a method 1200 that supports identifying calibration opportunities in accordance with aspects of the present disclosure. The operations of method 1300 may be implemented by a UE 115 or its components as described herein. For example, the operations of method 1300 may be performed by a calibration module as described with reference to FIGS. 6-9. The UE 115 may include a first device. In some examples, a UE may execute a set of instructions to control the functional elements of the UE to perform the functions described below. Additionally or alternatively, a UE may perform aspects of the functions described below using special-purpose hardware. The method 1300 may be combined with other aspects, processes, or embodiments discussed in relation to FIGS. 2A, 2B, 2C, 2D, 3, 4, 5A, 5B, 10, 11, and/or 12.

At 1305, the first device receives signals indicating a protocol configuration. The signals may indicate a system configuration such as a location of RACH symbols, SSB symbols, framework numerology, or the like. In addition, the signals may indicate a location of a power amplifier calibration gap. The protocol configuration may be included in a SIB, control information, or other information transmitted from a network node or other device.

At 1310, the first device receives signals indicating a first set of resources where the first device is scheduled to transmit or receive communications. The signals indicating the first set of resources may include grants for DL, UL, or sidelink communications. For example, the first device may be scheduled by a scheduling entity of a network.

At 1315, the first device identifies a power amplifier calibration gap in a protocol timeline. For example, the first device may identify the power amplifier calibration gap based on the protocol information. As a further example, the first device may determine whether a transmission or reception is scheduled during the power amplifier calibration gap. The power amplifier calibration gap may include resources for one or more of power amplifier calibration and digital predistorter (DPD) kernel selection. The power amplifier calibration gap may include a rank restricted power amplifier calibration gap. In one embodiment, the power amplifier calibration gap may include a total power amplifier calibration gap. In one embodiment, the power amplifier calibration gap may be marked for a purpose other than that needed by the first device. For example, the power amplifier calibration gap may be indicated for one purpose (either explicitly or preconfigured in an agreed protocol) but the first device is in need of a calibration for another purpose, such as for I Q mismatch or MPE measurement.

At 1320, the first device calibrates a wireless transceiver chain of the first device during the power amplifier calibration gap. In one embodiment, the first device calibrates a different part of the power amplifier calibration gap or performs a different type of calibration than indicated for the power amplifier calibration gap. In one embodiment, the first device calibrates one or more of a transmit power or a beam to a avoid a MPE level or a mismatch between an I section of the transceiver chain and a Q section of the transceiver chain, and/or a power density calibration. For example, the power amplifier calibration gap may have been configured or indicated for power amplifier calibration and DPD kernel selection but the first device instead uses the gap for calibrating an MPE level, I Q mismatch, and power density calibration. The first device may calibrate the transceiver chain by calibrating one or more a transceiver chains based on a rank of the rank restricted power amplifier calibration gap or based on the total power amplifier calibration gap. For example, the first device may select a subset of resources or antennas for use calibration based on the rank. In one embodiment, before and/or after calibration, the first device may use the same transceiver chain for receiving or transmitting communications in the first set of resources.

It should be noted that the methods described above describe possible implementations, and that the operations and the steps may be rearranged or otherwise modified and that other implementations are possible. Further, aspects from two or more of the methods may be combined.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. As mentioned previously, an eNB or other base station may be referred to as a gNB in 5G NR systems. Thus, discussions of eNB, or other similar terms, may be understood to apply to gNB in 5G NR deployments. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for calibration of a first device comprising:
   receiving, at a first device, one or more wireless signals indicating a first set of resources where the first device is scheduled to transmit or receive communications;
   identifying a third set of resources in which the first device has an option to transmit or receive communications based on a protocol configuration, wherein identifying the third set of resources comprises identifying a location of one or more synchronization signal block (SSB) symbols or one or more random access channel (RACH) symbols, wherein identifying the third set of resources further comprises determining that a continuous duration of symbols corresponding to the third set of resources together exceeds a threshold; and
   calibrating a wireless transceiver chain of the first device in a second set of resources, wherein the second set of resources exclude the first set of resources and includes at least a portion of the third set of resources.

2. The method of claim 1, further comprising receiving one or more signals indicating the protocol configuration, wherein the one or more signals indicating the protocol configuration indicate one or more of a radio resource control (RRC) configuration, a RACH configuration, or a SSB configuration.

3. The method of claim 1, wherein the third set of resources comprise at least one SSB symbol.

4. The method of claim 1, wherein the third set of resources comprise at least one RACH symbol.

5. The method of claim 1, wherein calibrating the transceiver chain comprises calibrating using external loopback, wherein calibrating using external loopback comprises:
   transmitting a signal using a first set of antennas of the first device; and
   measuring characteristics of the signal using a second set of antennas of the first device;
   wherein calibrating the transceiver chain comprises calibrating based on the characteristics of the signal.

6. The method of claim 5, further comprising detecting a proximity of an external object based on the measuring, wherein calibrating the transceiver chain comprises one or more of:
   calibrating based on the proximity of the external object; or
   calibrating a transmit power or beam width to avoid a maximum permissible exposure (MPE) level.

7. The method of claim 1, wherein calibrating the wireless transceiver chain comprises calibrating to eliminate or reduce an impairment in the transceiver chain, wherein calibrating comprises one or more of:
  correcting a mismatch between an in-phase (I) section of the transceiver chain and a quadrature (Q) section of the transceiver chain; or
  correcting a power amplifier non-linearity.

8. The method of claim 1, wherein calibrating the wireless transceiver chain of the first device comprises calibrating during a power amplified calibration gap in a protocol timeline.

9. The method of claim 8, wherein the power amplifier calibration gap comprises resources for one or more of power amplifier calibration and digital predistorter (DPD) kernel selection.

10. An apparatus comprising a first device, the apparatus comprising:
  one or more processors,
  memory in electronic communication with the one or more processors; and
  instructions stored in the memory and executable by the one or more processors to cause the first device to:
    receive one or more wireless signals indicating a first set of resources where the first device is scheduled to transmit or receive communications;
    identify a third set of resources in which the first device has an option to transmit or receive communications based on a protocol configuration, wherein identifying the third set of resources comprises identifying a location of one or more synchronization signal block (SSB) symbols or one or more random access channel (RACH) symbols, wherein identifying the third set of resources further comprises determining that a continuous duration of symbols corresponding to the third set of resources together exceeds a threshold; and
    calibrate a wireless transceiver chain of the first device in a second set of resources, wherein the second set of resources exclude the first set of resources and includes at least a portion of the third set of resources.

11. The apparatus of claim 10, wherein the instructions are further executable by the one or more processors to cause the first device to receive one or more signals indicating the protocol configuration, wherein the one or more signals indicating the protocol configuration indicate one or more of a radio resource control (RRC) configuration, a RACH configuration, or a SSB configuration.

12. The apparatus of claim 10, wherein the third set of resources comprise at least one SSB symbol.

13. The apparatus of claim 10, wherein the third set of resources comprise at least one RACH symbol.

14. The apparatus of claim 10, wherein calibrating the transceiver chain comprises calibrating using external loopback, wherein the instructions are executable by the one or more processors to cause the first device to calibrate using external loopback by:
  transmitting a signal using a first set of antennas of the first device; and
  measuring characteristics of the signal using a second set of antennas of the first device;
  wherein calibrating the transceiver chain comprises calibrating based on the characteristics of the signal.

15. The apparatus of claim 14, wherein the instructions are further executable by the one or more processors to cause the first device to detect a proximity of an external object based on the measuring, wherein calibrating the transceiver chain comprises one or more of:
  calibrating based on the proximity of the external object; or
  calibrating a transmit power or beam width to avoid a maximum permissible exposure (MPE) level.

16. The apparatus of claim 10, wherein calibrating the wireless transceiver chain comprises calibrating to eliminate or reduce an impairment in the transceiver chain, wherein the instructions are executable by the one or more processors to cause the first device to one or more of:
  calibrate by correcting a mismatch between an in-phase (I) section of the transceiver chain and a quadrature (Q) section of the transceiver chain; or
  calibrate by correcting a power amplifier non-linearity.

17. The apparatus of claim 10, wherein the transceiver chain is used for monitoring for or transmitting signals within the first resources.

18. A non-transitory computer-readable medium storing code for wireless communication at a user equipment (UE), the code comprising instructions executable by a processor to:
  receive one or more wireless signals indicating a first set of resources where the first device is scheduled to transmit or receive communications;
  identify a third set of resources in which the first device has an option to transmit or receive communications based on a protocol configuration, wherein identifying the third set of resources comprises identifying a location of one or more synchronization signal block (SSB) symbols or one or more random access channel (RACH) symbols, wherein identifying the third set of resources further comprises determining that a continuous duration of symbols corresponding to the third set of resources together exceeds a threshold; and
  calibrate a wireless transceiver chain of the first device in a second set of resources, wherein the second set of resources exclude the first set of resources and includes at least a portion of the third set of resources.

19. The computer-readable medium of claim 18, wherein the instructions are further executable to cause the first device to receive one or more signals indicating the protocol configuration, wherein the one or more signals indicating the protocol configuration indicate one or more of a radio resource control (RRC) configuration, a RACH configuration, or a SSB configuration.

20. The computer-readable medium of claim 18, wherein the third set of resources comprise at least one SSB symbol.

21. The computer-readable medium of claim 18, wherein the third set of resources comprise at least one RACH symbol.

22. The computer-readable medium of claim 18, wherein calibrating the transceiver chain comprises calibrating using external loopback, wherein the instructions are executable to cause the first device to calibrate using external loopback by:
  transmitting a signal using a first set of antennas of the first device; and
  measuring characteristics of the signal using a second set of antennas of the first device;
  wherein calibrating the transceiver chain comprises calibrating based on the characteristics of the signal.

23. The computer-readable medium of claim 22, wherein the instructions are further executable to cause the first device to detect a proximity of an external object based on the measuring, wherein calibrating the transceiver chain comprises one or more of:
  calibrating based on the proximity of the external object; or calibrating a transmit power or beam width to avoid a maximum permissible exposure (MPE) level.

24. The computer-readable medium of claim 18, wherein calibrating the wireless transceiver chain comprises calibrating to eliminate or reduce an impairment in the transceiver chain, wherein the instructions are executable to cause the first device to one or more of:
calibrate by correcting a mismatch between an in-phase (I) section of the transceiver chain and a quadrature (Q) section of the transceiver chain; or
calibrate by correcting a power amplifier non-linearity.

25. The computer-readable medium of claim 18, wherein the transceiver chain is used for monitoring for or transmitting signals within the first resources.

26. A first device, comprising:
means for receiving, at a first device, one or more wireless signals indicating a first set of resources where the first device is scheduled to transmit or receive communications;
means for identifying a third set of resources in which the first device has an option to transmit or receive communications based on a protocol configuration, wherein identifying the third set of resources comprises identifying a location of one or more synchronization signal block (SSB) symbols or one or more random access channel (RACH) symbols, wherein identifying the third set of resources further comprises determining that a continuous duration of symbols corresponding to the third set of resources together exceeds a threshold; and
means for calibrating a wireless transceiver chain of the first device in a second set of resources, wherein the second set of resources exclude the first set of resources and includes at least a portion of the third set of resources.

* * * * *